(12) United States Patent
Okumura

(10) Patent No.: US 7,628,550 B2
(45) Date of Patent: Dec. 8, 2009

(54) SINGLE-LENS REFLEX CAMERA CAPABLE OF DISPLAYING LIVE VIEW

(75) Inventor: Yoichiro Okumura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 405 days.

(21) Appl. No.: 11/788,667

(22) Filed: Apr. 19, 2007

(65) Prior Publication Data
US 2007/0253700 A1  Nov. 1, 2007

(30) Foreign Application Priority Data
Apr. 28, 2006  (JP) .............................. 2006-126503

(51) Int. Cl.
  *G03B 19/12* (2006.01)
(52) U.S. Cl. .................. 396/358; 396/354; 396/357
(58) Field of Classification Search ............... 396/354, 396/357, 358
  See application file for complete search history.

(56) References Cited
U.S. PATENT DOCUMENTS
6,164,844 A * 12/2000 Okumura et al. ............ 396/447
7,338,220 B2 * 3/2008 Tomatsu ..................... 396/358
2002/0071673 A1 * 6/2002 Kaihara et al. .............. 396/358

FOREIGN PATENT DOCUMENTS
JP   2002-369042   12/2002

* cited by examiner

*Primary Examiner*—Rodney E Fuller
(74) *Attorney, Agent, or Firm*—Straub & Pokotylo; John C. Pokotylo

(57) ABSTRACT

There is disclosed a single-lens reflex camera which does not drive a movable reflecting mirror when it enters a shooting operation while a live view is being displayed. For example, the rotation direction of a motor controlling the driving of shutter charge and a movable reflecting mirror can differ between a live view state and the other states. Then, a transmission mechanism for transmitting a driving force from the motor to the movable mirror is configured to release its engagement between the motor and the movable mirror when the motor rotates in a direction for the live view state.

19 Claims, 15 Drawing Sheets

| MS MOTOR 301 | MAIN GEAR 313 | DRIVING FORCE TRANSMITTING DESTINATION |
|---|---|---|
| CLOCKWISE (CW) | DIRECTION A | MIRROR UP/DOWN MECHANISM SHUTTER CHARGE MECHANISM |
| COUNTERCLOCKWISE (CCW) | DIRECTION B | SHUTTER CHARGE MECHANISM |

US 7,628,550 B2

SINGLE-LENS REFLEX CAMERA CAPABLE OF DISPLAYING LIVE VIEW

CROSS-REFERENCE TO RELATED APPLICATION

This application is based upon and claims the benefit of priority from prior Japanese Patent Application No. 2006-126503, filed on Apr. 28, 2006, the entire contents of which are incorporated herein by reference.

BACKGROUND OF THE INVENTION

1. Field of the Invention

The present invention relates to a single-lens reflex camera having a live view display function. The live view display function is to display a series of images repeatedly acquired by an image pickup device on a display device as a moving picture. The live view display function is also called a through-image display function or an electronic finder function.

2. Description of the Related Art

While traditional cameras were designed to view a subject image through an optical finder, a growing number of recent digital cameras have incorporated a function, so-called live view display function, for displaying live images acquired by an image pickup device continuously on a display device such as an LCD monitor or the like. These digital cameras having the live view display function may have an optical finder or not.

Such a live view display function causes no parallax, for example, and it is effective for macro shooting and the like. For this and other reasons, various examples of including the live view display function in the single-lens reflex digital camera have been proposed.

For example, there is proposed a single-lens reflex digital camera capable of displaying a live view, in which an optical finder display mode and an electronic finder display mode are selectable (Japanese Patent Application Laid-Open No. 2002-369042). In this digital single-lens reflex camera, when the electronic finder display mode is selected, a movable mirror is retracted from the shooting optical path and a focal-plane shutter is fully opened to guide light of a subject image to an image pickup device in order to display a series of acquired subject images continuously on an LCD monitor.

In the meantime, in a single-lens reflex camera having this type of live view function, the shutter charge operation and the retraction of the movable reflecting mirror from the shooting optical path are performed concurrently. Then, when the camera enters a shooting operation from a state where a live view is being displayed, the shutter closing operation is necessary once to block light entering the image pickup device in order to prevent a smear phenomenon on the image pickup device. On the other hand, since the movable reflecting mirror is in the retracted state from the shooting optical path while the live view is being displayed, it has only to maintain the state even when the camera enters the shooting operation. However, conventionally, the movable reflecting mirror is also driven when the camera enters the shooting operation from the state where the live view is being displayed.

BRIEF SUMMARY OF THE INVENTION

The single-lens reflex camera of the present invention, capable of displaying a live view, does not drive the movable reflecting mirror when the camera enters the shooting operation from a status a live view is being displayed.

An exemplary structure of the single-lens reflex camera capable of displaying a live view of the present invention can be expressed as follows: A single-lens reflex camera capable of displaying a live view comprises: a motor; an image pickup device; a movable reflecting mirror movable between a first position for reflecting subject light from a photographing lens arranged in front of the image pickup device and a second position retracted from the optical path of the photographing lens to guide the subject light from the photographing lens to the image pickup device; a shutter arranged between the image pickup device and the movable reflecting mirror; a first drive mechanism for charging the shutter; a second drive mechanism for driving the movable reflecting mirror between the first position and the second position; and a third drive mechanism for driving the first drive mechanism and the second drive mechanism by using the rotation of the motor in a first direction and for driving only the first drive mechanism by using the rotation of the motor in a second direction.

The present invention can also be understood as a drive method for a single-lens reflex camera capable of displaying a live view.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 2A shows the internal structure along the optical axis direction of a photographing lens, and FIG. 2B shows the internal structure as viewed from the front of a camera body 200;

FIG. 5A is a perspective view of the shutter, FIG. 5B is a front view of the shutter, FIG. 5C is a perspective view of the movable reflecting mirror, FIG. 5D shows a mirror-down state of the movable reflecting mirror, and FIG. 5E shows a mirror-up state of the movable reflecting mirror;

FIG. 15A shows the subject image through an optical finder, and FIG. 15B shows the subject image in a live view display state on an LCD monitor.

DETAILED DESCRIPTION OF THE PREFERRED EMBODIMENT

A preferred embodiment of the invention is described below with reference to the accompanying drawings.

Figure 1:
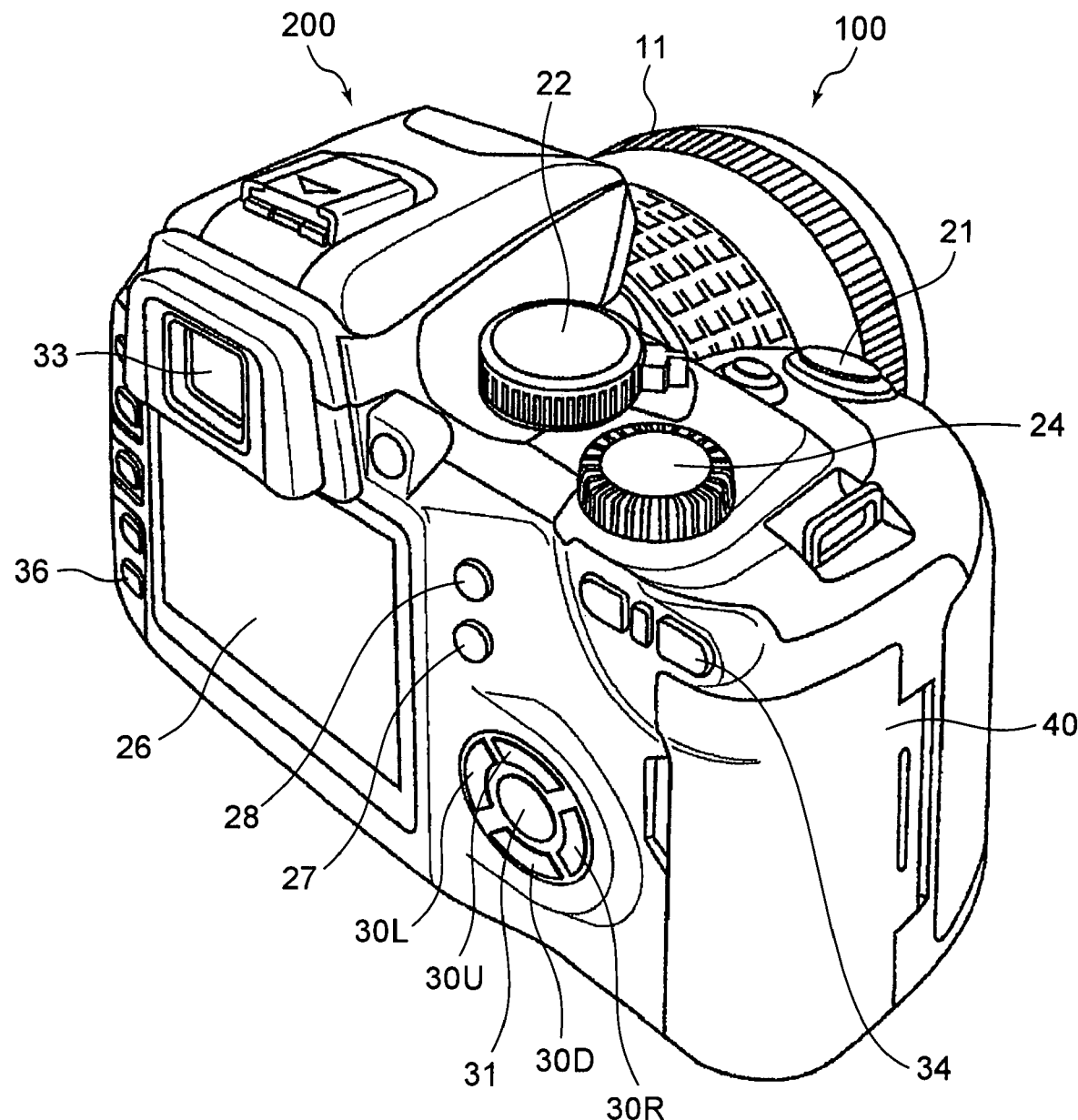
FIG. 1 is an exterior perspective view of a single-lens reflex digital camera according to a preferred embodiment of the present invention.

The preferred embodiment is described below using a single-lens reflex digital camera to which the present invention is applied. FIG. 1 is an exterior perspective view of the single-lens reflex digital camera according to the embodiment of the present invention as viewed from its back side.

A release button 21, a mode dial 22, a control dial 24, etc. are arranged on the top face of a camera body 200. The release button 21 has a first release switch that is turned on at the half press of the release button 21 and a second release switch that is turned on at the full press of the release button 21. When this first release switch (hereinafter abbreviated as "1R") is turned on, the camera performs shooting preparation operations, such as focus detection, focusing of a photographing lens, measuring subject brightness, etc. Then, when the second release switch (hereinafter abbreviated as "2R") is turned on, the camera performs a shooting operation for capturing image data of a subject image based on the output of a CCD (Charge Coupled Device) 221 (see FIG. 6) as an image pickup device.

The mode dial 22 is a rotatable operating member to allow a camera user to set it to any picture or word icon provided on the mode dial 22 to indicate each shooting mode in order to select the set shooting mode. The shooting modes include, for example, a full-auto shooting mode, a program shooting mode, an aperture priority shooting mode, a shutter priority shooting mode, a manual shooting mode, a portrait shooting mode, a landscape shooting mode, a macro shooting mode, a sport shooting mode, and a night scene shooting mode. The control dial 24 is an operating member for setting shooting information such as shutter speed, aperture value, ISO sensitivity, and other compensation values. The camera user can turn the control dial 24 to change various setting values.

On the back of the camera body 200, an LCD monitor 26 and various buttons are arranged. The LCD monitor 26 is a display device used not only to display a live view or playback-display recorded subject images, but also to display shooting conditions and menus. The display device is not limited to the LCD as long as it can display all of the above. The various buttons include a playback button 27, a menu button 28, an UP arrow button 30U, a DOWN arrow button 30D, a RIGHT arrow button 30R, a LEFT arrow button 30L (these arrow buttons 30U, 30D, 30R, and 30L may generically be referred to as an "arrow pad" 30 below), an OK button 31, a display switching button 34, and a preview button 36. The playback button 27 is an operation button to instruct the camera to playback-display a subject image recorded after shot on the LCD monitor 26. Upon playback-display, subject image data compressed in JPEG or the like and stored in an SDRAM 237 or recording medium 245 to be described later is decompressed and displayed.

The arrow pad 30 is an operating member to move a cursor two-dimensionally in the X and Y directions on the LCD monitor 26. The four UP, DOWN, RIGHT, and LEFT buttons can be replaced by a two-dimensionally operable switch capable of detecting operating directions on the two dimensions such as a touch switch. The OK button 31 is an operating member to confirm each of various options selected using the arrow pad 30, the control dial 24, or the like. The menu button 28 is a button for switching to a menu mode for setting various modes of this digital camera. When the menu mode is selected at the press of this menu button 28, a menu screen appears on the LCD monitor 26. The menu screen has a multi-layered structure, so that the camera user can select any one of various items using the arrow pad 30 and confirm the selected item by pressing the OK button 31. The preview button 36 is an operation button for giving an instruction to narrow the aperture of the photographing lens from the maximum aperture in order to check the depth of focus during viewing of a subject image.

An eyepiece part 33 is an eyepiece part of a finder optical system to allow the camera user to look therethrough to check the subject image. The display switching button 34 is an operation button for switching between live view display and information display to be described below. The live view display is a mode to allow the camera user to view the subject image on the LCD monitor 26 based on the output of the CCD 221 for subject image recording. The information display is a mode displayed on the LCD monitor 26 for display setting of camera shooting information.

A recording medium compartment cover 40 is attached to a side face of the camera body 200 to freely open/close. When this recording medium compartment cover 40 is opened, there is a loading slot for a recording medium 245 (see FIG. 6) therein, and the recording medium 245 can be removably loaded into the camera body 200. Further, a manual operating ring 11 for focusing is provided around a lens barrel 100. This manual operating ring 11 is an operating ring for power focus (which may also be abbreviated as "PF"). When the camera user manually rotates the manual operating ring 11, the photographing lens is motor-driven to move a focusing lens forward or backward depending on the direction, speed, and amount of rotation, etc.

Figure 2A:
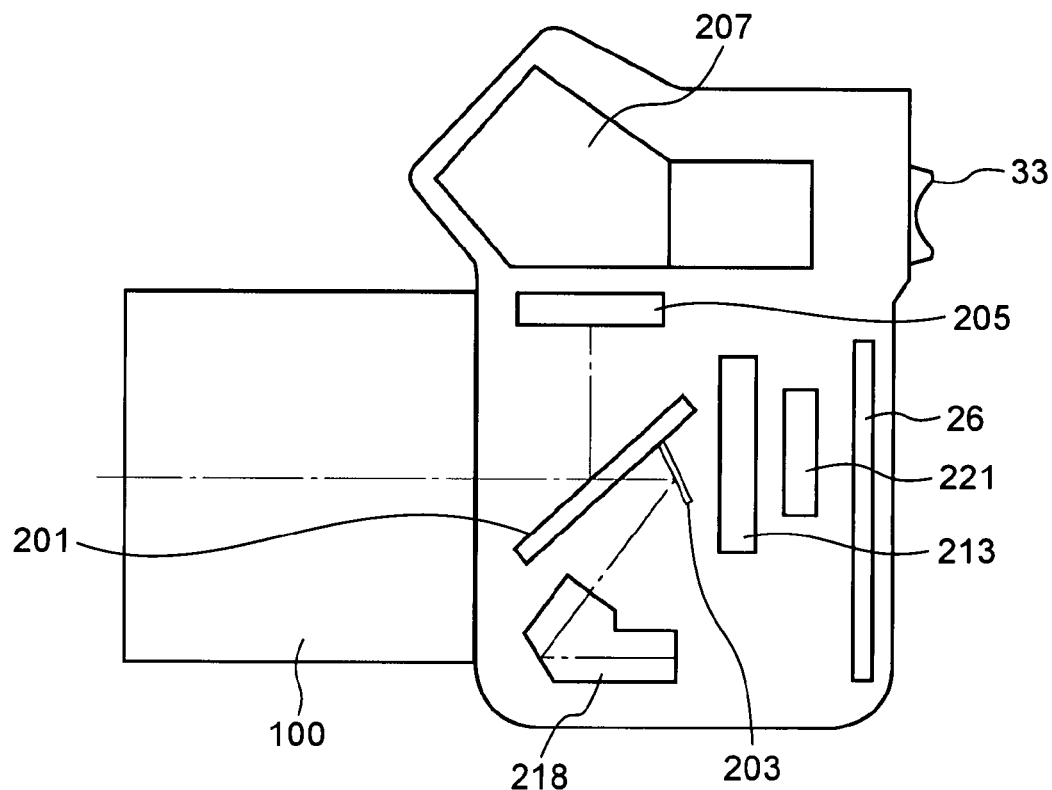
FIGS. 2A and 2B are block diagrams schematically showing an internal mechanism of the single-lens reflex digital camera according to the preferred embodiment of the present invention, where
Figure 2B:
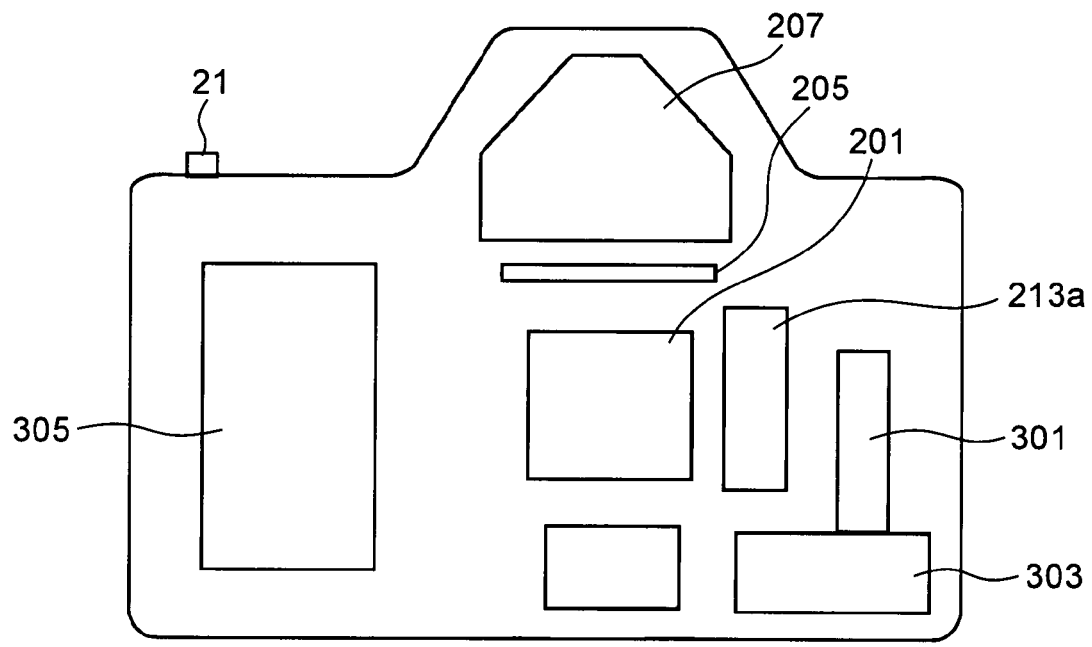

FIGS. 2A and 2B are block diagrams showing the schematic structure of an internal mechanism of the digital single-lens reflex camera according to the embodiment of the present invention. FIG. 2A is an internal structure diagram along the optical axis direction of the photographing lens. FIG. 2B is an internal structure diagram as viewed from the front of the camera body 200.

A movable reflecting mirror 201 is arranged inside a mirror box of the camera body 200 on the optical axis of a photographing lens 101 (see FIG. 6) arranged inside the lens barrel 100. This movable reflecting mirror 201 is movable between a position 45 degrees inclined with respect to the optical axis of the photographing lens 101 to reflect a subject light beam into a finder optical system (for example, a pentaprism 207, etc.) and a position retracted from the shooting optical path to guide the subject light beam to an image pickup device (a CCD (Charge Coupled Device) 221 to be described later). The axis of rotation of the movable reflecting mirror 201 is along a direction perpendicular to the paper surface of FIG. 2A. Thus, the subject light beam is reflected upward by this movable reflecting mirror 201. In the embodiment, the direction of reflection of the subject light beam is upward, but the present invention is not limited to the upward direction. Any direction can be selected, right or left, as long as the direction of the reflection is the best suited to the arrangement of mechanical members and optical members of the camera. Further, the movable mirror 201 is used as an optical-path changing member, but the present invention is not limited thereto, and any other member capable of changing the optical path can be used.

A focusing screen 205 is arranged on the reflected optical axis of the movable reflecting mirror 201. The focusing screen 205 is a mat surface on which the subject light beam through the photographing lens 101 is focused to form a subject image. The focusing screen 205 is arranged at a position spaced from the movable reflecting mirror 201 by a distance equal to the distance between the movable reflecting mirror 201 and the CCD 221. A pentaprism 207 is arranged above the focusing screen 205 to flip the subject image horizontally left to right.

The central portion of the above-mentioned movable reflecting mirror 201 is formed into a half mirror. A sub-mirror 203 for distance measurement is provided on the backside of this movable reflecting mirror 201 to reflect the subject light beam passing through the half mirror portion. This sub-mirror 203 is movable with respect to the movable reflecting mirror 201. In other words, when the movable reflecting mirror 201 is retracted from the shooting optical path to let the subject light beam enter the CCD 221, the sub-mirror 203 is moved to a position to cover the half mirror portion. On the other hand, when the movable reflecting mirror 201 is at the position for viewing the subject image as shown in FIG. 2A, the sub-mirror 203 is at a position where it remains popped up at an angle to the movable reflecting mirror 201. This movable reflecting mirror 201 is driven by a shutter/mirror driving unit 303. Further, a distance measurement unit 218 including a TTL phase-difference type distance measurement circuit 217 (see FIG. 6) including a distance measurement sensor is arranged on the reflected optical path of the sub-mirror 203. This distance measurement unit 218 detects a defocus amount of the subject image formed through the photographing lens.

A focal-plane type shutter 213 for exposure time control is arranged behind the movable reflecting mirror 201. The driving of this shutter 213 is controlled by a shutter control part 213a including a shutter drive mechanism 215 (FIG. 6) and the shutter/mirror driving unit 303. The CCD 221 as the image pickup device is arranged behind the shutter 213. The CCD 221 photoelectrically converts the subject image formed through the photographing lens into an electric signal. In the embodiment, the CCD is used as the image pickup device, but the present invention is not limited to the CCD, and any other two-dimensional image pickup device such as a CMOS (Complementary Metal Oxide Semiconductor) can be used.

A battery 305 is arranged on the left when viewed from the front of the camera body 200 to supply power to the entire camera body. On the right side of the body, a mirror/shutter (hereinafter abbreviated as "MS") motor 301 is arranged. As will be described later, this MS motor 301 is a drive source for the shutter 213 and the movable reflecting mirror 201. The shutter/mirror driving unit 303 for transmitting the driving force of this MS motor 301 is arranged below the MS motor 301 to engage with the drive shaft of the MS motor 301. Further, the shutter control part 213a is arranged at the side of the movable reflecting mirror 201 to control the driving of the shutter 213.

Figures 3A, 3B:
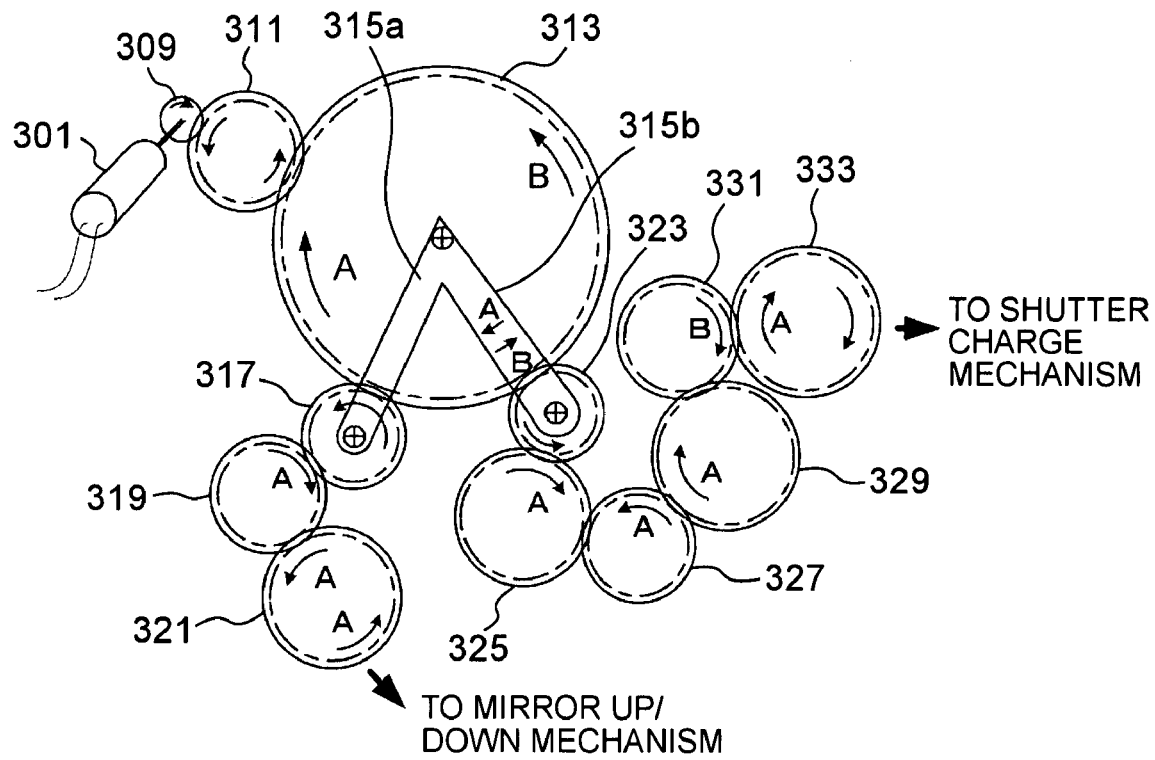
FIG. 3A is a view showing partial details of a shutter/mirror driving unit of the single-lens reflex digital camera according to the preferred embodiment of the present invention.
FIG. 3B is a table showing the relationship between the rotation direction and the driving-force transmitting direction of a mirror/shutter motor.
Figure 4:
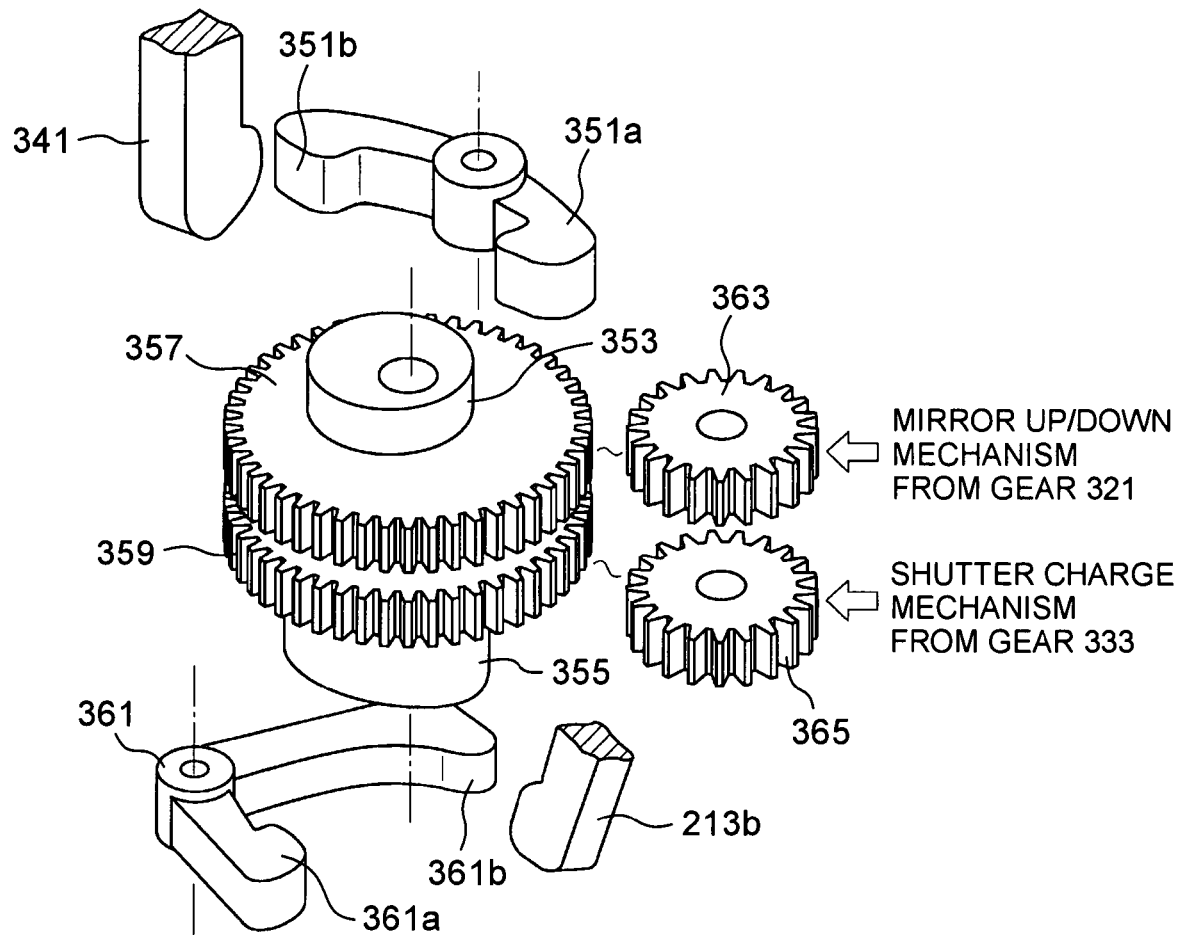
FIG. 4 is an exploded perspective view showing partial details of the shutter/mirror driving unit of the single-lens reflex digital camera according to the preferred embodiment of the present invention.

Next, a driving control mechanism of the movable reflecting mirror 201 and the shutter 213 will be described with reference to FIGS. 3 to 5. FIG. 3A shows partial details of the shutter/mirror driving unit 303. The drive shaft of the MS motor 301 is integrated with a gear 309, and this gear 309 is meshed with a gear 311. The gear 311 is meshed with a main gear 313 as a sun gear. A V-shaped carrier 315 consisting of a pair of arms integrally formed is supported rotatably on the center of rotation of this main gear 313. A planetary gear 317 is supported rotatably at the end of one arm 315a of this carrier 315, and a planetary gear 323 is supported rotatably at the end of the other arm 315b.

The planetary gear 317 is capable of meshing with a gear 319, and this gear 319 is meshed with a gear 321. The gear 319 and the gear 321 form a gear train A. This gear 321 is to transmit a driving force to a mirror up/down mechanism (see FIG. 5) to be described later. The planetary gear 323 is capable of meshing with a gear 325. The gear 325, a gear 327, a gear 329, a gear 331, and a gear 333 are meshed with adjacent gears, respectively, to form a gear train B. The gear 333 is to transmit a driving force to a shutter charge mechanism (see FIG. 5) to be described later.

The angle between the two arms of the carrier 315 is set to mesh the planetary gear 317 with the gear 319 and the planetary gear 323 with the gear 325 when the main gear 313 is rotated clockwise (CW) (in direction A in FIG. 3A). Further, the gear 319, the gear 325, and the gear 331 are so positioned that, when the main gear 315 is rotated counterclockwise (CCW) (in direction B in FIG. 3A), the planetary gear 323 is meshed with the gear 331 located halfway in the gear train B, and the planetary gear 317 is released from meshing with the gear 319 without meshing with any other gear.

FIG. 3B shows the driving directions of the MS motor 301 and driving force transmitting destinations. When the MS motor 301 rotates clockwise (CW), the main gear 313 rotates in direction A in FIG. 3A to mesh the planetary gear 317 with the gear 319. The driving force transmitted to the gear 319 is transmitted to the mirror up/down mechanism through the gear 321 meshed with the gear 319. On the other hand, the planetary gear 323 is meshed with the gear 325. The driving force transmitted to the gear 325 is transmitted to the gear 333 through the plurality of gears 327, 329, and 331, and transmitted from the gear 333 to the shutter charge mechanism.

When the MS motor 301 rotates counterclockwise (CCW), the main gear 313 rotates in direction B. As a result, since the planetary gear 317 is released from meshing with the gear 319, the transmission of the driving force to the mirror up/down mechanism is stopped. On the other hand, the planetary gear 323 is released from meshing with the gear 325, and is meshed with the gear 331. The driving force transmitted to the gear 331 is transmitted to the shutter charge mechanism through the gear 333 meshed with the gear 331. FIG. 4 is an exploded perspective view of the shutter/mirror driving unit 303 to which the driving force of the above-mentioned MS motor 301 is transmitted. The above-mentioned mirror up/down mechanism and shutter charge mechanism are included in the shutter/mirror driving unit 303.

The mirror up/down mechanism will first be described. The driving force of the MS motor 301 is transmitted to a cam gear 357 through a gear 363 receiving the driving force from the above-mentioned gear 321. A mirror charge cam 353 is fixed on this cam gear 357, and one end 351a of a mirror charge lever 351 is arranged to come into contact with this mirror charge cam 353. The other end 351b of this mirror charge lever 351 is arranged to come into contact with a mirror drive lever 341. Since the mirror drive lever 341 is urged by a spring (see FIG. 5D) in a direction to rotate the mirror charge lever 351 clockwise, the one end 351a of the mirror charge lever 351 comes into press contact with the mirror charge cam 353. Therefore, the mirror charge cam 353 integrated with the cam gear 357 is rotated along with the rotation of the cam gear 357 to rotate the mirror charge lever 351 that is in press contact with the cam surface of this mirror charge cam 353. The movement of this mirror charge lever 351 moves the mirror drive lever 341 that is in press contact with the mirror charge lever 351.

The shutter charge mechanism will next be described. The driving force of the MS motor 301 is transmitted to a cam gear 359 through a gear 365 receiving the driving force from the above-mentioned gear 333. A shutter charge cam 355 is fixed on this cam gear 359, and one end 361a of a shutter charge lever 361 is arranged to come into contact with this shutter charge cam 355. The other end 361b of this shutter charge lever 361 is arranged to come into contact with a shutter set lever 213b. Therefore, the shutter charge cam 355 integrated with the cam gear 359 is rotated along with the rotation of the cam gear 359 to rotate the shutter charge lever 361 that is in contact with the cam surface of this shutter charge cam 355. As a result, the shutter set lever 213b that is in contact with the shutter charge lever 361 is also rotated.

Although the above-mentioned cam gear 357 and cam gear 359 are co-axially disposed, they can rotate independently of each other without interfering with each other. Further, though not shown, the mirror charge cam 353 or a member driven together with the mirror charge cam 353 is provided with a mirror-UP photointerruptor (MU Pi) to detect the position of the mirror charge cam 353. Similarly, the shutter charge cam 355 or a member driven together with the shutter charge cam 355 is provided with a shutter charge photointerruptor (SC Pi) to detect the position of the shutter charge cam 355. The amount of drive of the MS motor 301 is adjusted based on the detection results of these photointerruptors. Both the shutter charge cam 355 and the mirror charge cam 353 are so formed that the circumference face varies radially from the axis of rotation, respectively.

Figure 5A:
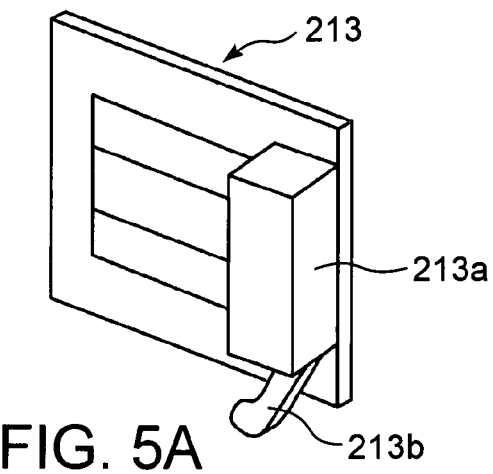
FIGS. 5A to E are views showing a shutter and a movable reflecting mirror of the single-lens reflex digital camera according to the preferred embodiment of the present invention, where
Figure 5B:
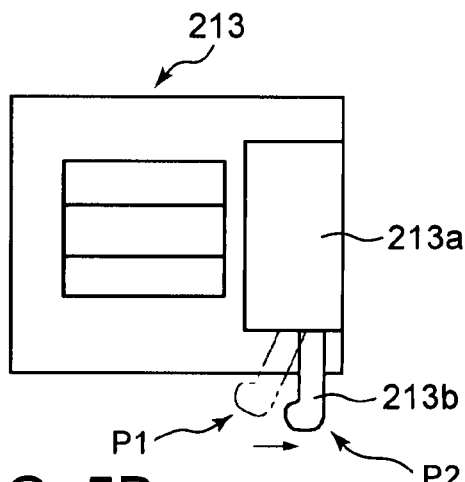
Figure 5C:
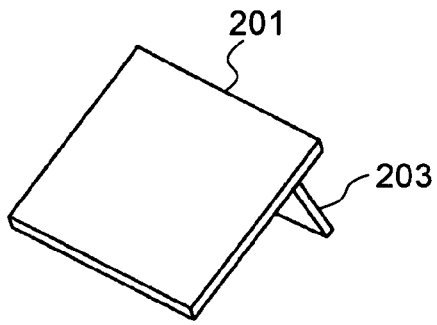
Figure 5D:
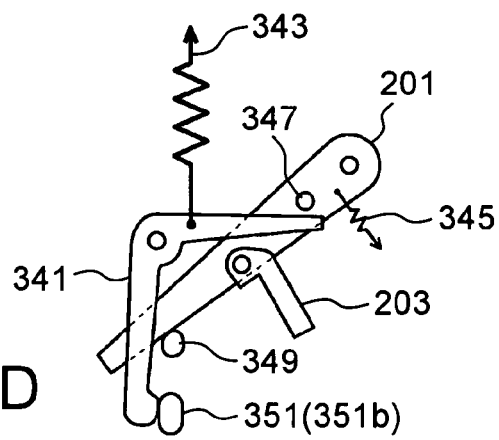
Figure 5E:
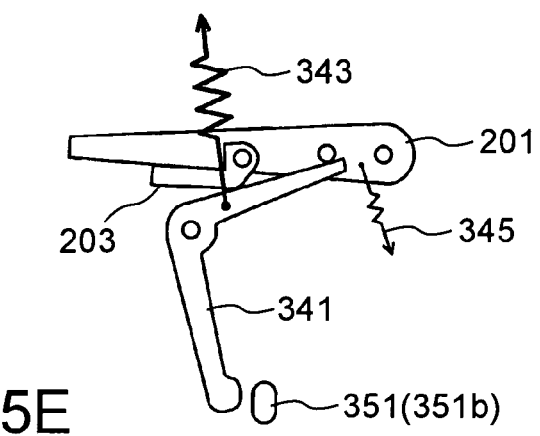

FIGS. 5A to 5E are views showing the shutter and the movable reflecting mirror. FIG. 5A is a perspective view of the shutter 213, and FIG. 5B is a front view of the shutter 213. FIG. 5C is a perspective view of the mirror. FIGS. 5D and 5E are views showing mirror-down and mirror-up states of the movable reflecting mirror 201, respectively.

As shown in FIG. 5A, the shutter control part 213a is arranged at the side of the shutter 213. The shutter set lever 213b projects from the bottom of this shutter control part 213a. This shutter set lever 213b is initially located at position Pi indicated by a broken line in FIG. 5B, and upon completion of shutter charge, it moves to position P2 indicated by a solid line in FIG. 5B.

As shown in FIG. 5C, when the movable reflecting mirror 201 is in the down state, the sub-mirror 203 is at the position where it is kept popping up to the movable reflecting mirror 201. As shown in FIG. 5D, a mirror-down spring 345 is provided on the side of the axis of rotation of the movable reflecting mirror 201 to urge the movable reflecting mirror 201 counterclockwise in FIG. 5D, i.e., in the down direction. The position of the movable reflecting mirror 201 urged by this mirror-down spring 345 is restricted by a position restricting pin 349 45 degrees with respect to the shooting optical path. The mirror drive lever 341 has an L-type shape and is urged by a mirror drive spring 343 counterclockwise, i.e., in the up direction. One end of the mirror drive lever 341 is capable of engaging with an engaging pin 347 fixed to the movable reflecting mirror 201. Note that the spring force of the mirror drive spring 343 is set always greater than the spring force of the mirror-down spring 345.

In the mirror down state, the mirror drive lever 341 is moved clockwise by the mirror charge lever 351 against the urging force of the mirror drive spring 343 to the position as shown in FIG. 5D. Under this condition, when the mirror charge lever 351 stopping the mirror drive lever 341 in an engaged state moves to the right in the drawing, the mirror drive lever 341 is rotated counterclockwise by the urging force of the mirror drive spring 343. Along with this rotation, the movable reflecting mirror 201 is rotated through the engaging pin 347 from the down position to the up position as shown in FIG. 5E.

The drive mechanism of the shutter 213 and the reflecting mirror 201 is configured as mentioned above. In other words, when the MS motor 301 rotates clockwise (CW), the mirror charge cam 353 is rotated through the gear 321. This rotation causes the mirror charge lever 351 to move from the position shown in FIG. 5D to the position shown in FIG. 5E, so that the movable reflecting mirror 201 is rotated to the mirror-up (rising) position by the urging force of the mirror drive spring 343. In this mirror-up state, when the MS motor 301 further rotates clockwise (CW), the mirror charge cam 353 is rotated through the gear 321 to move the mirror charge lever 351 from the position shown in FIG. 5E to the position shown in FIG. 5D, while charging the mirror drive spring 343, thus changing to the mirror-down state.

On the other hand, when the MS motor 301 rotates counterclockwise (CCW), since the carrier 315 is rotated counterclockwise, meshing between the planetary gear 317 and the gear 319 is released. However, since the gear ratio from the gear 319 to the gear 357 is sufficiently high, the gear 321 is not rotated and hence the mirror charge lever 351 is not moved. Therefore, the reflecting mirror 201 is not moved.

Further, when the MS motor 301 rotates clockwise (CW), the shutter charge cam 355 is rotated through the gear 333. This rotation causes the shutter set lever 213b to move from position P1 to position P2 in FIG. 5B, changing to the shutter charge state. In this shutter charge state, when the MS motor 301 further rotates clockwise (CW), the shutter charge cam 355 is rotated through the gear 333 to return the shutter set lever 213b from position P2 to position P1 in FIG. 5B. Under this condition, the traveling of a shutter curtain is started by terminating the energization of a magnet (Mg) holding the shutter curtain.

On the other hand, when the MS motor 301 rotates counterclockwise (CCW), since the carrier 315 is rotated counterclockwise, meshing between the planetary gear 323 and the gear 325 is released to mesh the planetary gear 323 with the gear 331. This allows the driving force of the MS motor to be transmitted to the shutter charge mechanism through the gear 333 to perform shutter charge in the same manner as mentioned above.

Thus, in the embodiment, when the MS motor 301 rotates in one direction (clockwise), the mirror is flipped up and down while performing shutter charge. On the other hand, when the MS motor 301 rotates in the other direction (counterclockwise), only the shutter charge is performed without flipping the mirror up and down.

Figure 6:
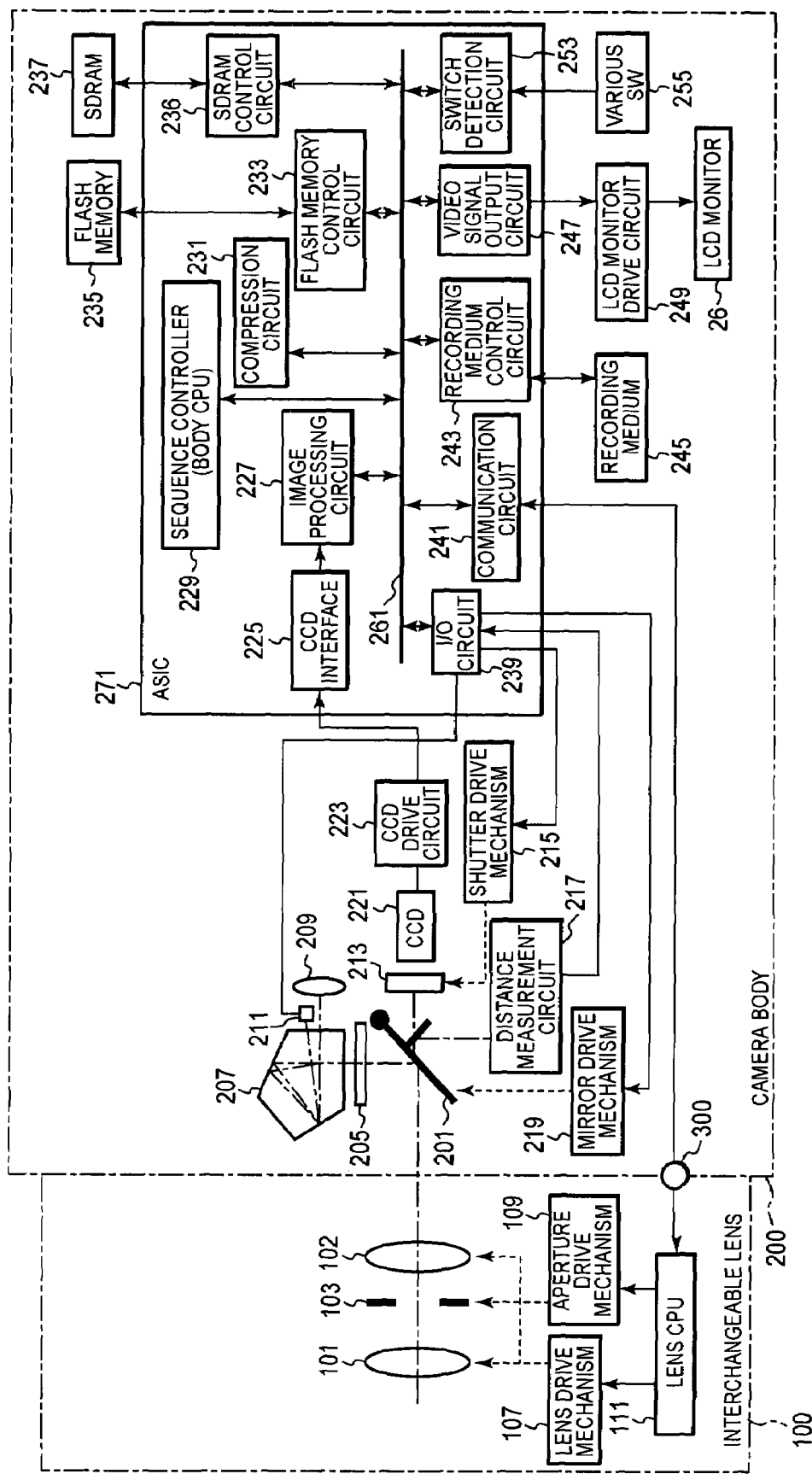
FIG. 6 is a block diagram showing the general structure, mainly of an electric system, of the single-lens reflex digital camera according to the preferred embodiment of the present invention.

Referring next to FIG. 6, the general structure of the single-lens reflex digital camera will be described, mainly about its electric system. As mentioned above, in the single-lens reflex digital camera according to the embodiment, the interchangeable lens 100 and the camera body 200 are constructed separately and electrically connected through a communication contact 300. Note here that the interchangeable lens 100 and the camera body 200 can be integrally constructed.

Inside the interchangeable lens 100, lenses 101 and 102 for focusing adjustment and focal length adjustment, and an aperture 103 for adjusting the amount of light passing therethrough are arranged. The lenses 101, 102 are driven by a lens drive mechanism 107 and the aperture 103 is driven by an aperture drive mechanism 109. The lens drive mechanism 107 and the aperture drive mechanism 109 are connected to a lens CPU 111, respectively, and the lens CPU. 111 is connected to the camera body 200 through the connection contact 300. The lens CPU 111 controls the components inside the interchangeable lens 100. In other words, the lens CPU 111 controls the lens drive mechanism 107 to perform focusing and zoom driving, while it controls the aperture drive mechanism 109 to control the aperture value.

Inside the camera body 200, the movable reflecting mirror 201, the sub-mirror 203, the focusing screen 205, and the pentaprism 207 are arranged in the manner mentioned above. The movable reflecting mirror 201 is driven by a mirror drive mechanism 219. An eyepiece lens 209 used for viewing the subject image is arranged on the exit side of the pentaprism 207. A photometric sensor 211 is arranged at the side of the eyepiece lens 209 and in a position not to interfere with viewing of the subject image. The photometric sensor 211 includes multi-zone photometric elements for dividing the subject image to measure the brightness of the subject image.

Further, as mentioned above, the sub-mirror 203 is provided on the backside of the movable mirror 201, and the distance measurement circuit 217 is arranged in the reflective direction of this sub-mirror 203. The shutter 213 is arranged behind the movable mirror 201, and the driving of this shutter 213 is controlled by the shutter drive mechanism 215. The CCD 221 as the image pickup device is arranged behind the shutter 213 to photoelectrically convert, into an electric signal, the subject image formed thereon through the lenses 101 and 102. The CCD 221 is connected to a CCD drive circuit 223 through which analog digital conversion (AD conversion) is performed. The CCD drive circuit 223 is connected to an image processing circuit 227 through a CCD interface 225. This image processing circuit 227 performs various image processing such as color correction, gamma (γ) correction, contrast correction, etc. In addition, the image processing circuit 227 creates image data for live view display on the LCD monitor 26.

The image processing circuit 227 is connected to a data bus 261 inside an ASIC (Application Specific Integrated Circuit) 271. Connected to this data bus 261 other than the image processing circuit 227 are a body CPU 229, a compression circuit 231, a flash memory control circuit 233, an SDRAM control circuit 236, an I/O circuit 239, a communication circuit 241, a recording medium control circuit 243, a video signal output circuit 247, and a switch detection circuit 253.

The body CPU 229 connected to the data bus 261 controls the overall flow of this single-lens reflex digital camera. The compression circuit 231 connected to the data bus 261 is a circuit for compressing image data stored in an SDRAM 237 using JPEG or TIFF format. Note that the image compression format is not limited to JPEG or TIFF, and any other compression method can be employed. The flash memory control circuit 233 connected to the data bus 261 is connected to a flash memory 235. This flash memory 235 stores a program for controlling the overall flow of the single-lens reflex camera, and the body CPU 229 controls the single-lens reflex digital camera according to the program stored in this flash memory 235. The flash memory 235 is an electrically rewritable nonvolatile memory. The SDRAM 237 is connected to the data bus 261 through the SDRAM control circuit 236. This SDRAM 237 is a buffer memory for temporary storage of image data processed by the image processing circuit 227 or image data compressed by the compression circuit 231.

The I/O circuit 239 is connected with the above-mentioned photometric sensor 211, the shutter drive mechanism 215, the distance measurement circuit 217, and the mirror drive mechanism 219, respectively, to control input and output of data to and from each circuit such as the body CPU 229 through the data bus 261. The communication circuit 241 connected to the lens CPU 111 through the communication contact 300 is connected to the data bus 261 to communicate with the body CPU 229 and the like for exchange of data and communication of control instructions. The recording medium control circuit 243 connected to the data bus 261 is connected to a recording medium 245 to control the recording of image data and the like onto the recording medium 245. The recording medium 245 is a rewritable recording medium to be removably loaded into the camera body 200, such as an xD-Picture Card(™), a Compact Flash(™), an SD Memory Card(™), or a Memory Stick(™). Alternatively, a hard disk can be connected through the communication contact.

The video signal output circuit 247 connected to the data bus 261 is connected to the LCD monitor 26 through a LCD monitor drive circuit 249. The video signal output circuit 247 is a circuit for converting image data, stored in the SDRAM 237 or the recording medium 245, into a video signal for display on the LCD monitor 26. The LCD monitor 251 is arranged on the back of the camera body 200, but the location thereof is not limited to the backside. The LCD monitor 251 can be arranged on any side as long as the camera user can view it, and be of any type other than the LCD type. Further, various switches 255, such as switches for detecting first and second strokes of a shutter release button, a switch for instructing a playback mode, a switch for instructing the movement of the cursor on the screen of the LCD monitor 26, a switch for instructing a shooting mode, the OK switch for confirming each of selected modes, etc., are connected to the data bus 261 through the switch detection circuit 253.

Figure 7:
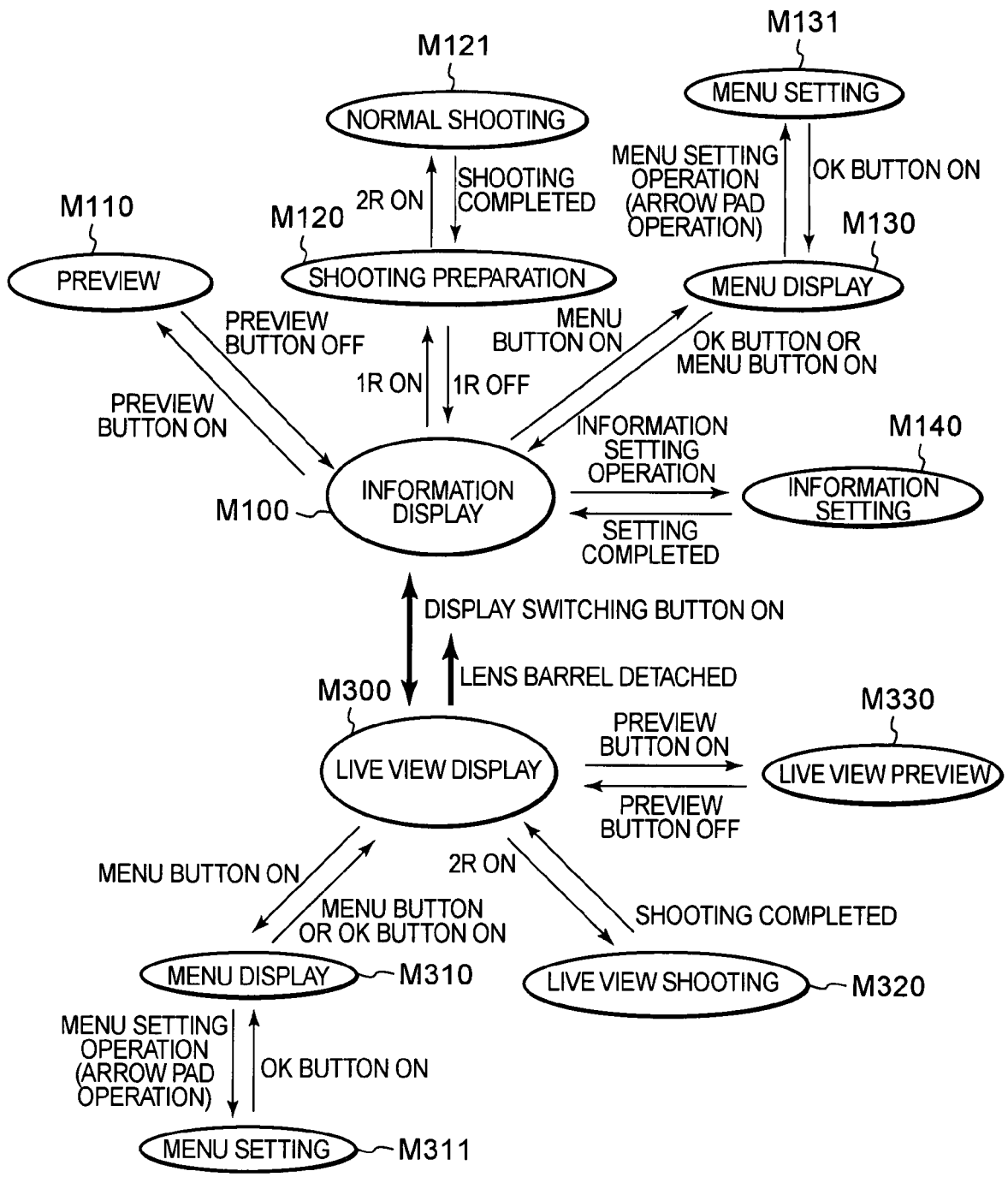
FIG. 7 is a block diagram showing display modes and an operation mode/menu layered structure of the single-lens reflex digital camera according to the preferred embodiment of the present invention.

Referring next to FIG. 7, the hierarchy structure of display/operation modes of the single-lens reflex digital camera according to the embodiment will be described.

The main display/operation modes are two: information display M100 and live view display M300. The information display M100 is initialized upon power-on of the camera body 200. This information display mode is to display basic information for shooting with the camera. Specifically, in this mode, a screen of information display including the shooting mode, shutter speed, aperture, AF mode, flash mode, pixel count, etc. appears on the LCD monitor 26. The shooting mode such as a program mode or a shutter speed priority mode is set by turning the mode dial 22. Further, the numeric values for sensitivity, shutter speed, aperture value, compensation value, pixel count, etc. are set by selecting each item on the information display screen using the arrow pad 30 and setting each numeric value by turning the control dial 24.

Figure 15A:
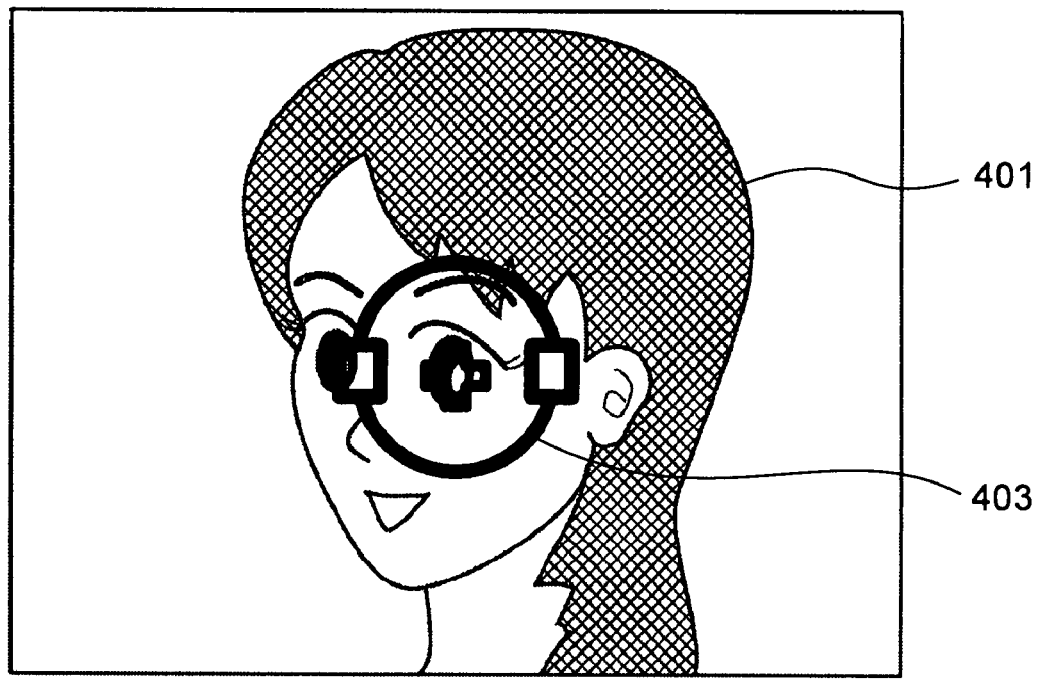
FIGS. 15A and 15B are illustrations of a subject image in the preferred embodiment of the present invention, where
Figure 15B:
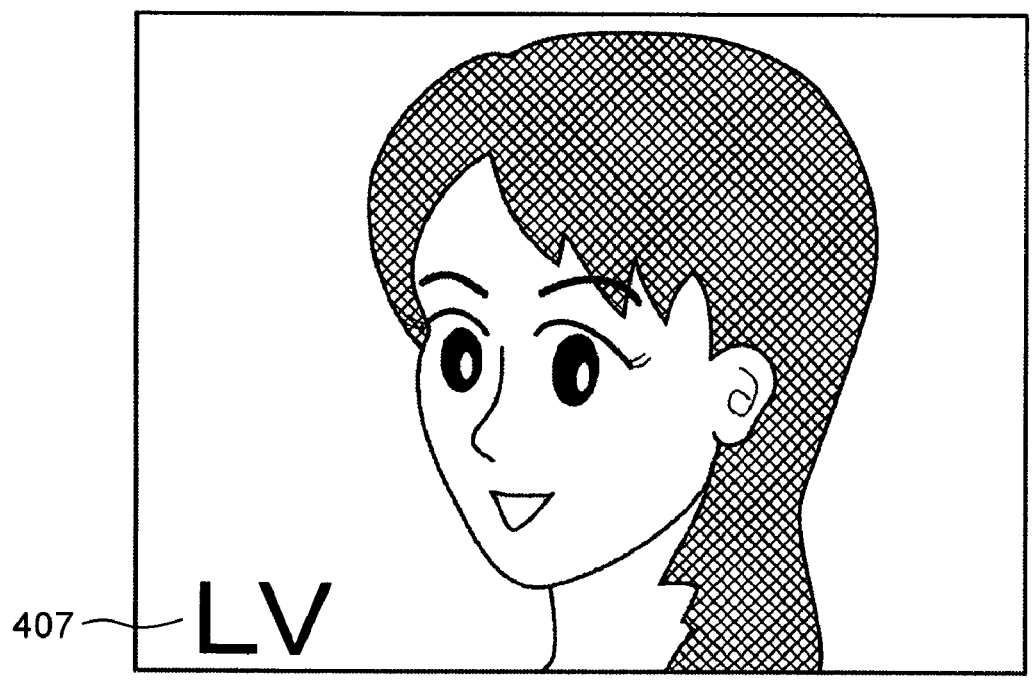

The live view display M300 is a mode for displaying a live view on the LCD monitor 26. In this mode, the movable reflecting mirror 201 is retracted from the shooting optical path to open the shutter 213 and let the subject light beam be directly focused on the CCD 221 to produce a subject image. This subject image is converted to a photoelectrically converted signal, and based on this signal, the subject image for viewing is displayed on the LCD monitor 26. The subject light beam is directly received by the CCD 221 in this mode, and this can prevent a reduction in the amount of light reaching the CCD 221, making it possible to sufficiently display even an image of a dim subject. In the live view display M300 mode, the autofocus is disabled by nature. In other words, since the movable reflecting mirror 201 is retracted, the distance measurement circuit 217 is rendered inoperative, and in this case, focusing is manually adjusted. In order to indicate that the current display is a live view display, "LV" (see reference numeral 407) is displayed as shown in FIG. 15B at the lower left of the screen on the LCD monitor 26. Further, in this mode, since the distance measurement by the distance measurement circuit 217 is disabled, no AF frame 403 is displayed unlike the display in the optical finder in the information display mode as shown in FIG. 15A. The "live view display" indication is not limited to "LV", and any other symbol, character(s) such as "B", "CCD", or "FINDE CCD", icon, etc. can, of course, be used.

Upon power-on of the camera body 200, the information display M100 is initialized. Switching from this information display M100 to the live view display M300 is done by operating the display switching button 34. When the display switching button 34 is operated in the information display M100 mode, the information display M100 is switched to the live view display M300, while when the display switching button 34 is operated in the live view display M300 mode, the live view display M300 returns to the information display M100. Here, data indicating that the live view display M300 was set is stored in a nonvolatile memory, not shown, and the data is held after power-off of the camera body 200. Alternatively, the camera can, of course, be reset to either the information display or the live view display upon power-on. Further, as a special case, when a lens detection switch (not shown) detects that the lens barrel 100 has been detached from the camera body 200, the live view display M300 is switched to the information display M100.

Returning to FIG. 7, the lower layers of the information display M100 will next be described. In the information display M100 mode, when the release button 21 is pressed halfway (1R ON), shooting preparation operations such as light metering and distance measurement are performed (M120). Further, when the release button 21 is fully pressed (2R ON), a normal shooting operation is performed to read the output of the CCD 221 and record image data on the recording medium 245 (M121). After completion of the shooting operation, when the half-press of the release button 21 is released (1R OFF), the screen returns to the information display M100. Further, when the menu button 28 is turned on, a menu screen for setting loading of a card, drive mode, flash compensation, etc. appears (M130). On this screen, the camera user can operate the arrow pad 30 to move the cursor and select a desired item, and after selecting the desired item, the camera user can press the OK button 31 to confirm the selected setting (M131). The display mode can return from the menu display M130 to the information display M100 by turning on the menu button 28 or the OK button 31. Further, the camera user can operate the mode dial 22, the control dial 24, and the arrow pad 30 on the screen of the information display M100 to set a desired mode/value (M140).

As for the lower layers of the live view display M300, first, when the menu button 28 is pressed and turned on in the live view display M300, the menu display appears (M310). Here, the camera user operates the arrow pad 30 to select a desired item (M311). Then, when the camera user presses the OK button 31 to confirm the selected setting, the display returns to the menu display M310. The display mode can return from the menu display to the live view display M300 by turning on the menu button 28 or the OK button 31. In the live view display state, even if the release button 21 is pressed halfway, nothing happens because the movable reflecting mirror 201 is in the retracted state and the shutter 213 is open. Then, when the release button 21 is fully pressed to turn 2R on, a live-view shooting operation is performed to record image data on the recording medium 245 based on an image signal from the CCD (M320).

Figure 8:
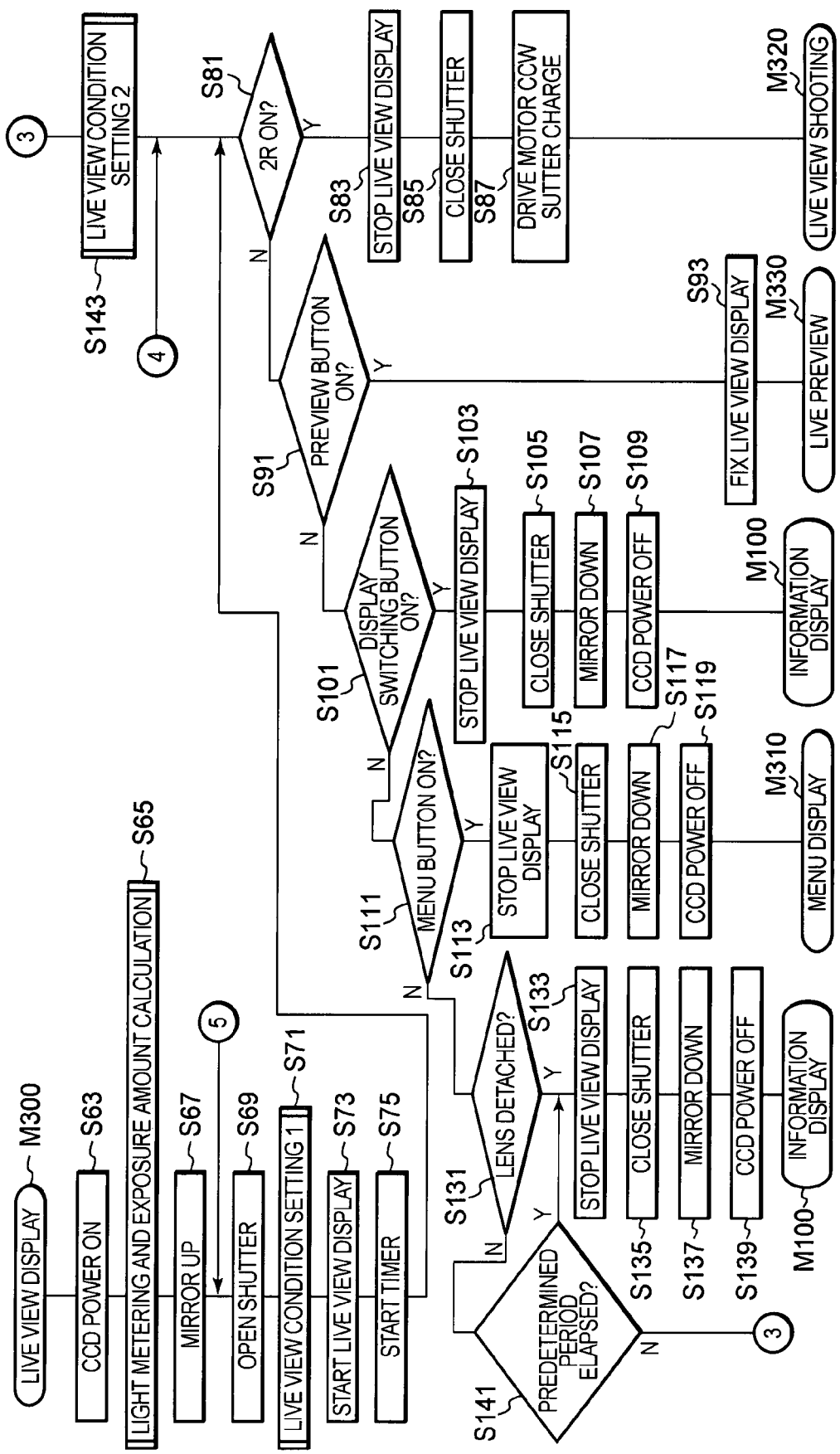
FIG. 8 is a flowchart for live view display of the single-lens reflex digital camera in the preferred embodiment of the present invention.

Referring next to FIG. 8, the flow of the live view display M300 will be described. When the camera enters the live view display mode, power supply to the CCD 221 is first started (S63). Then, subject brightness is measured based on the output of the photometric sensor 211a to calculate exposure values such as shutter speed and aperture value based on the measured value (S65). Then, the movable reflecting mirror 201 is flipped up (mirror up) to retract it from the shooting optical path (S67, see T00 in FIG. 12 to be described later). Then, the focal-plane shutter 213 is brought into an open state (S69, see T01 in FIG. 12) to form a subject image on the CCD 221. Then, a subroutine "Live View Display Condition Setting 1" is executed to keep a proper brightness of live view display on the LCD monitor 26 (S71). After that, the live view display is started (S73). In step S73, the live view display, i.e., live view display based on image signals output from the CCD 221 is started. The live-view display operation is controlled by the image processing circuit 227 in response to this start instruction. Then, a timer is started (S75) and the procedure goes to step S81. The timer value is determined in step S141 to be described later.

In step S81, it is determined whether the release button 21 is fully pressed, that is, whether 2R is on or not. If it is on, the procedure goes to the shooting operation (timing T1 in FIG. 12). First, the live view display on the LCD monitor 26 is stopped, i.e., the live view display is stopped (S83). Then, the focal-plane shutter 213 is closed and returned to its initial state (S85). Then, the MS motor 301 starts rotating counterclockwise (CCW) to drive the shutter set lever 351 to the shutter charge state indicated by P2 in FIG. 5B (S87, T2 in FIG. 12). At this time, since the MS motor 301 rotates counterclockwise, the movable reflecting mirror 201 is kept in the mirror-up state after it is flipped up in step S67.

After that, the procedure shifts to the live-view shooting operation (M320). Although the details will be described later with reference to FIG. 9, this subroutine is to open the shutter 213 and let the CCD 221 perform an imaging operation, and after completion of the imaging operation, to return the aperture 103 and the shutter 213 to their initial positions. After completion of this live-view shooting operation, the procedure returns to step 69 to repeat the above-mentioned steps.

Returning to step S81, if 2R is off, the procedure goes to step S91 to determine whether the preview button 36 is on or not. If it is on, the procedure enters a preview operation. First, in preparation for the preview operation, the live view display is fixed (S93). This is to prevent the brightness of the image to be previewed from varying unnaturally upon narrowing down the aperture. After that, the procedure goes to the live view preview (M330) to display live subject images successively on the LCD monitor 26 based on the output of the CCD 221 while narrowing down the aperture 103 to a set value.

If 2R is off in step S81 and the preview button 36 is off in step S91, the procedure goes to step S101 to determine whether the display switching button 34 is on or not. If it is on, the display screen returns to the information display M100 after steps S103 to S109 are executed to terminate the live view display. In this processing, the live view display is stopped (S103), the focal-plane shutter 213 is closed (S105), the movable reflecting mirror 201 is returned from the retracted position to the position for reflecting the light beam into the finder optical system (S107), and the CCD 221 is powered off (S109). After completion of these operation steps, the display screen returns to the information display M100.

If the display switching button 34 is off in step S101, the procedure goes to step S111 to determine whether the menu button 28 is on or not. As a result of determination, if it is on, the menu display M310 is provided after steps S113 to S119 are executed to terminate the live view display. This processing is the same as the above-mentioned processing steps S103 to S109, and the description thereof will be omitted.

As a result of determination in step S111, if it is off, the procedure goes to step S131 to determine based on the output of the lens detection switch (not shown) whether the lens barrel 100 is removed from the camera body 200. If the determination result is Yes, i.e., when the lens barrel 100 has been detached, the information display M100 is provided. In the live view display mode, the movable reflecting mirror 201 is in the state retracted from the shooting optical path and the focal-plane shutter 213 is in the open state. In this case, since the CCD 221 is exposed to the outside, there is a danger that dust or the like may adhere to the CCD 221. Therefore, the live view display M300 is terminated to prevent dust or the like from adhering to the imaging surface of the CCD 221. In order to terminate the live view display, steps S133 to S139 are executed. These processing steps S133 to S139 are the same as the above-mentioned processing steps S103 to S109, and the description thereof will be omitted.

If the determination result in step S131 is No, it means that the lens barrel 100 remains mounted. In this case, the procedure goes to step S141 to determine whether the value of the timer started at step S75 indicates that a predetermined time period has elapsed. As a result of determination, if the predetermined time period has not elapsed, the procedure goes to the above-mentioned step S81 after executing a subroutine "Live View Display Condition Setting 2" in step S143. On the other hand, if the predetermined time period has elapsed, the procedure goes to step S133 to stop the live view display and provide the information display M100. The reason for stopping the live view display after the lapse of predetermined time period is that if the live view display lasts for a long time, the CCD 221 will heat up, and hence noise can occur in the output image.

Figure 9:
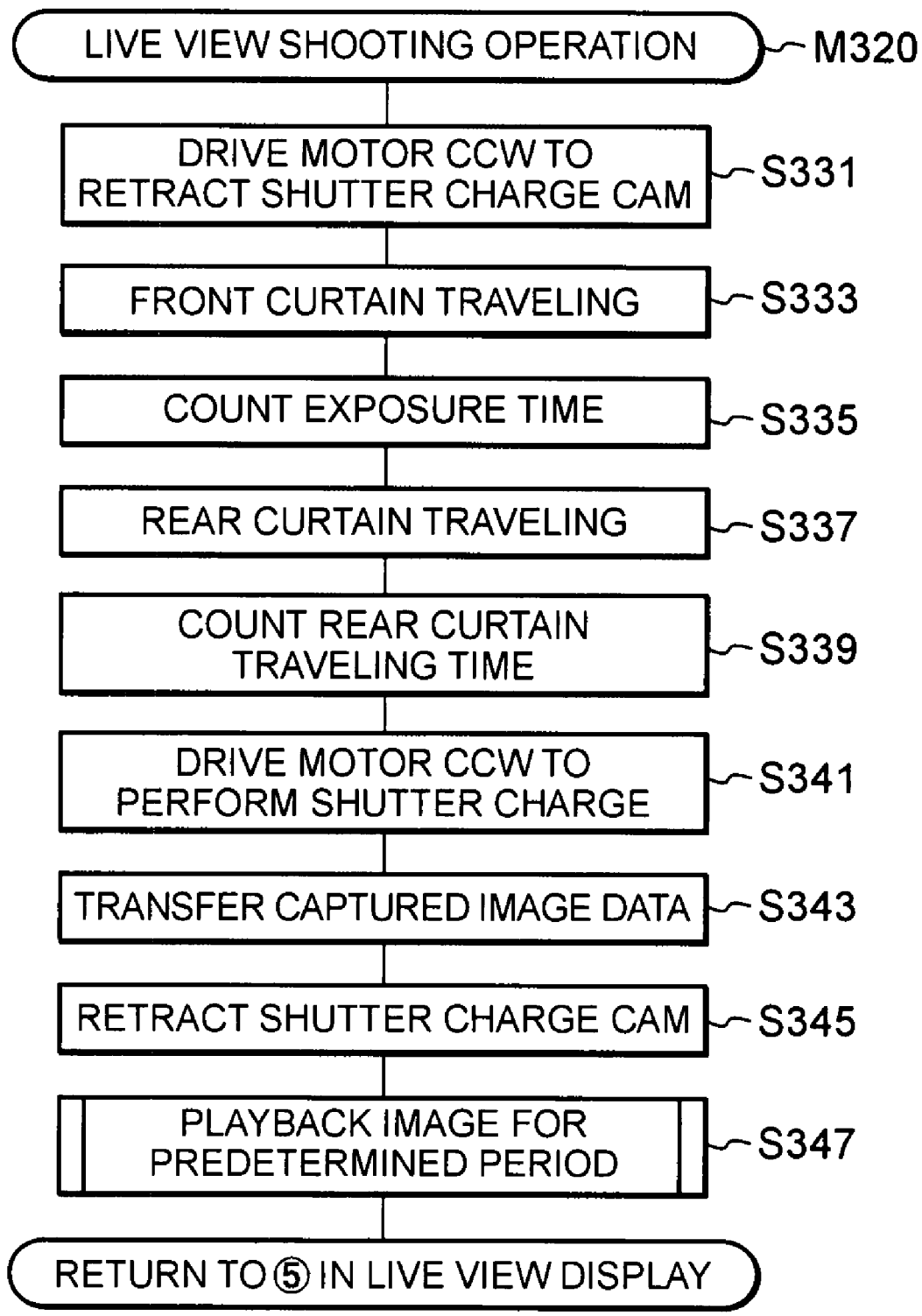
FIG. 9 is a flowchart showing a live-view shooting operation of the single-lens reflex digital camera in the preferred embodiment of the present invention.
Figure 12:
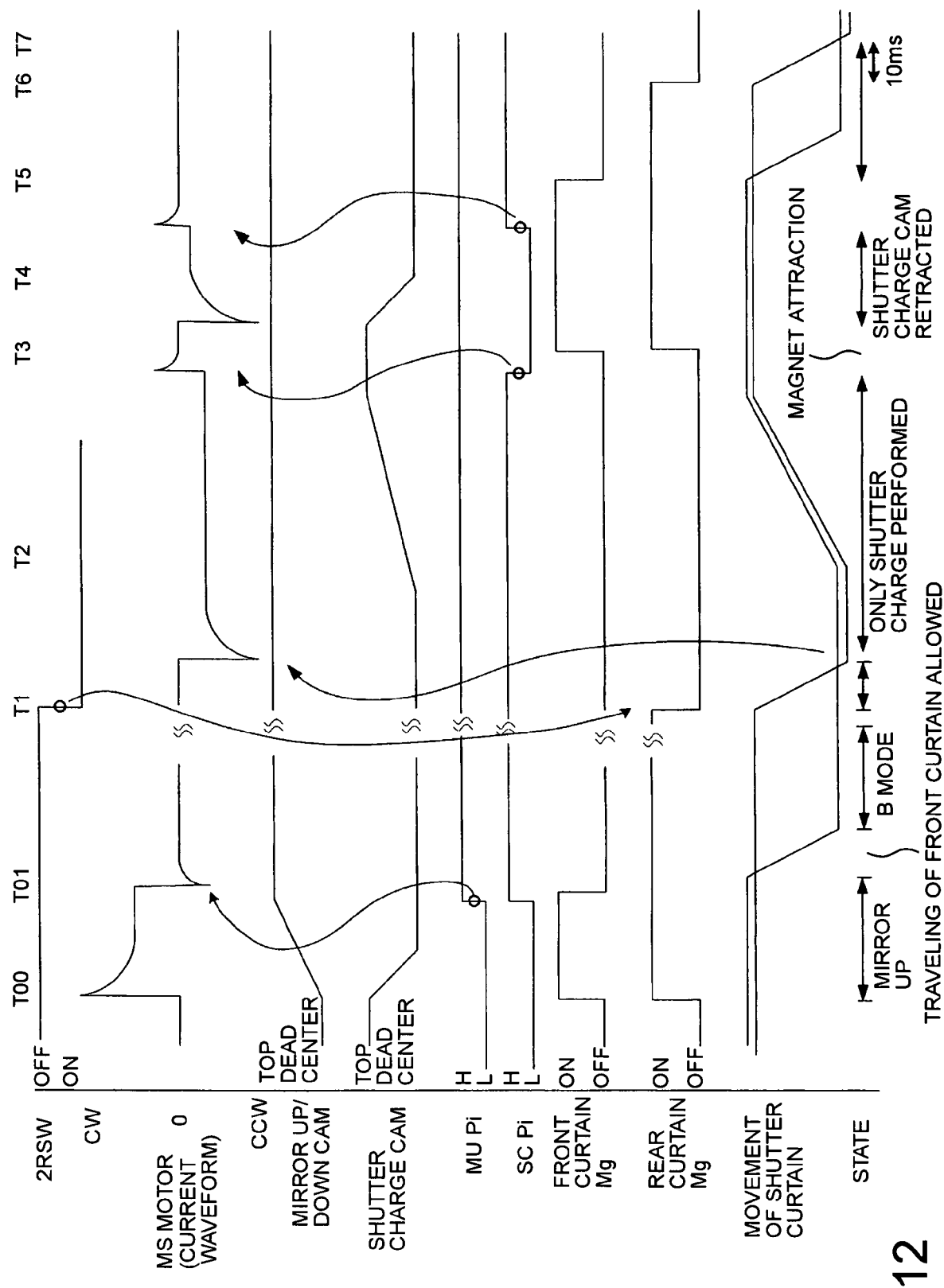
FIG. 12 is a timing chart for live view display of the single-lens reflex digital camera in the preferred embodiment of the present invention, showing up to the completion of the traveling of a rear curtain.
Figure 13:
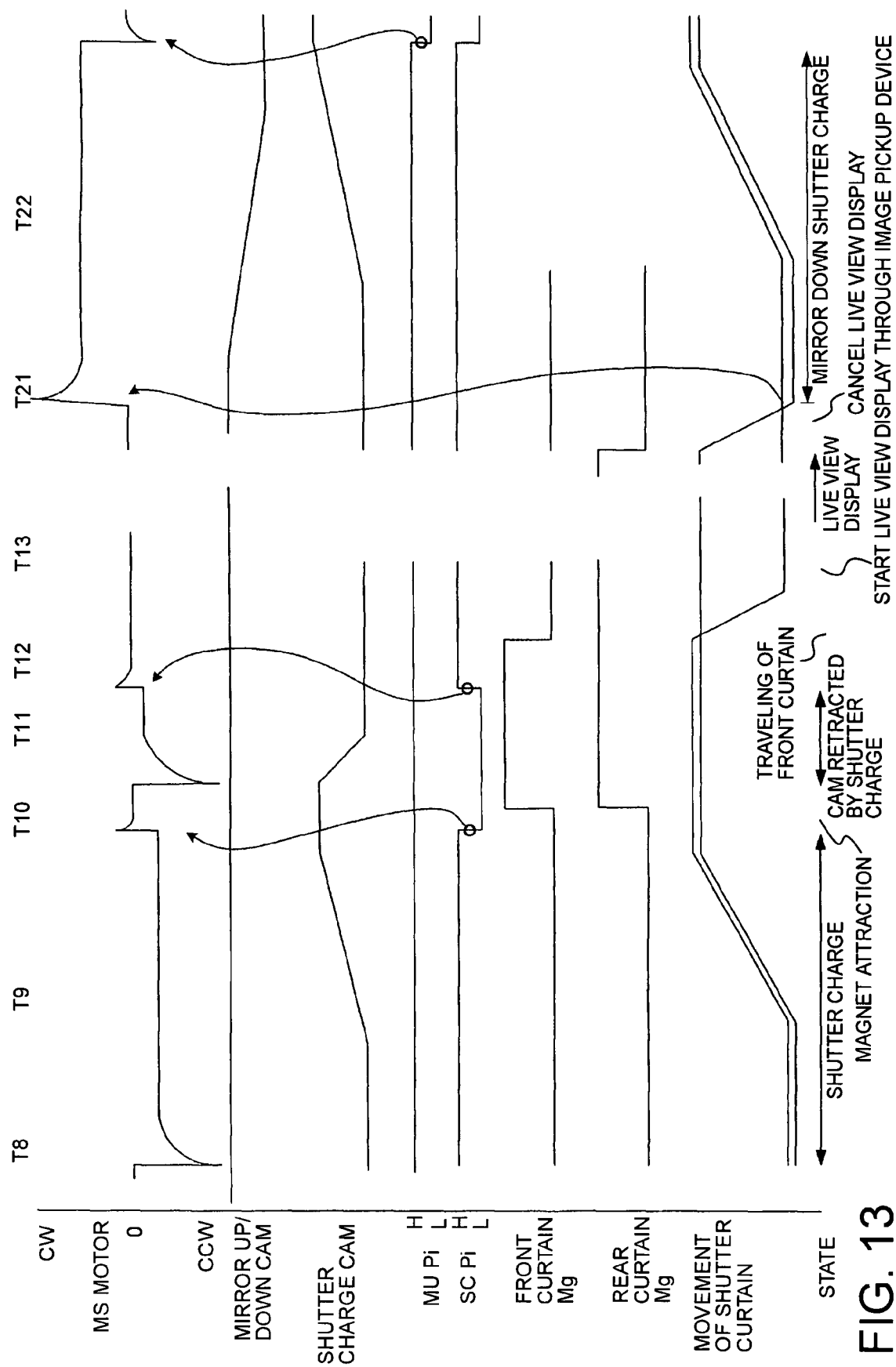
FIG. 13 is a timing chart for live view display of the single-lens reflex digital camera in the preferred embodiment of the present invention, showing after the completion of the traveling of the rear curtain.

Referring next to a flowchart of FIG. 9 and timing charts of FIGS. 12 and 13, the live-view shooting operation M320 will be described. First, in step S331, magnets Mg for holding the shutter curtains are energized (T3 in FIG. 12) to suck in the shutter curtains. After that, the MS motor 301 is driven counterclockwise (CCW) (T4 in FIG. 12) to move the shutter charge cam 355 to the retracted position and retract the shutter set lever 213b (state P1 in FIG. 5B). Then, in step S333, the energization of the front curtain magnet Mg holding the shutter front curtain is stopped to start the traveling of the front curtain (T5 in FIG. 12). Simultaneously with the start of the traveling of the front curtain, counting the exposure time is started (S335). The exposure time is decided based on the shutter speed value calculated in step S65 based on the output of the above-mentioned photometric sensor 211. When this exposure time has elapsed, the procedure goes to step S337 to stop the energization of the rear curtain magnet Mg holding the shutter rear curtain in order to start the traveling of the shutter rear curtain (T6 in FIG. 12).

Then, the procedure goes to step S339 to count the time (e.g., about 10 ms) required to complete the traveling of the shutter rear curtain, and after the elapse of this time, the procedure goes to step S341. Here, the MS motor 301 is driven counterclockwise (CCW) again to perform shutter charge, changing the position of the shutter set lever 213b to P2 in FIG. 5B (T9 in FIG. 13). Then, subject image data captured by the CCD 221 based on the photoelectrically converted signal is transferred (S343). In the embodiment, the captured image data is transferred after completion of the shutter charge operation in step S341, but both steps can be executed concurrently. Next, the front curtain magnet Mg and the rear curtain magnet Mg are energized to suck in and hold the shutter curtains, respectively. After that, the MS motor 301 is driven counterclockwise (CCW) to retract the shutter charge cam 355 (S345; state P1 in FIG. 5B and timing T11 in FIG. 13). Then, based on the captured image data transferred in step S343, the shot subject image is playback-displayed on the LCD monitor 26 for a predetermined period of time (S347).

After completion of image playback for the predetermined period of time, the procedure returns to step S69 in the flow of the live view display shown in FIG. 8 to resume the live view display. When the procedure returns to step S69, the MS motor 301 is first driven counterclockwise (CCW) to perform shutter charge (T9 in FIG. 13). Then, the magnets Mg for holding the shutter curtains are energized to suck in and hold them (T10 in FIG. 13). After that, the MS motor 301 is driven counterclockwise (CCW) again to move the shutter charge cam 355 to the retracted position (T11 in FIG. 13). Under this condition, the energization of only the magnet Mg holding the shutter front curtain is stopped to start the traveling of the shutter front curtain (T12 in FIG. 13). This causes the subject image to be formed on the CCD 221, so that since live view display is possible, the live view display is started in step S73.

Thus, in the embodiment, when the release button 21 is operated to turn 2R on during the live view display M300 in order to perform the shooting operation, the MS motor 301 is driven counterclockwise (CCW) to perform shutter charge without driving the movable reflecting mirror 201. Therefore, sound generated upon driving the movable reflecting mirror can be eliminated to reduce the sound generated during shooting.

During the live view display M300, when the display switching button 34 is operated (S101), or when the lens is detached (S131), the display screen returns to the information display M100. On the other hand, when the menu button 28 is operated during the live view display M300, the procedure shifts to the menu display operation M310. In these cases, the live view display M300 is cancelled. The following describes the operation of the shutter/mirror driving unit 303 at this time with reference to the timing chart of FIG. 13.

Upon cancellation of the live view display, the live view display is first stopped (S103, S113, or S133 in FIG. 8; T21 in FIG. 13). Then, the energization of the rear curtain magnet Mg is stopped to drive the MS motor 301 to rotate clockwise (CW). As a result, both the shutter set lever 213b and the mirror charge lever 355 are driven to perform shutter charge and mirror-down (T22 in FIG. 13).

Figure 10:
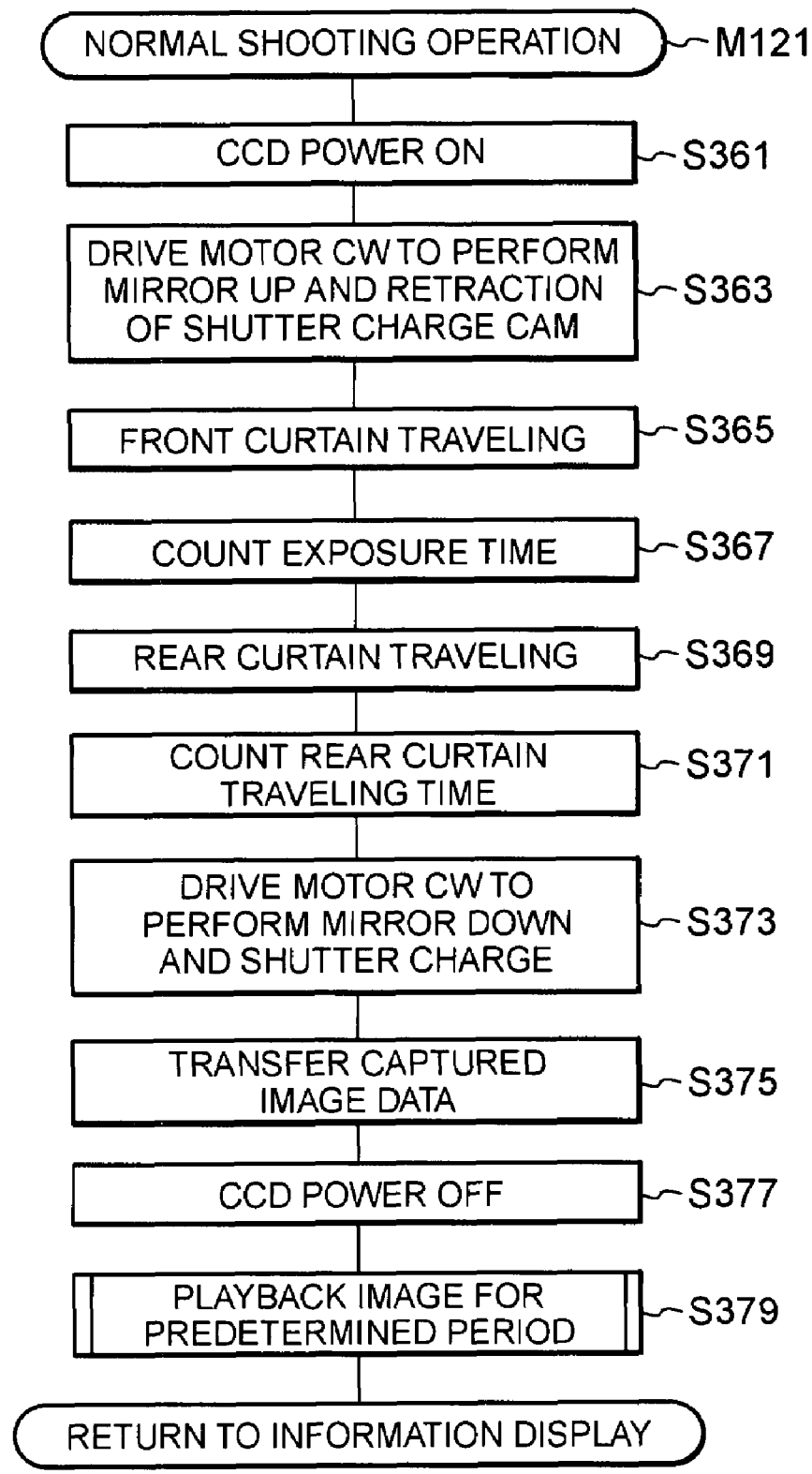
FIG. 10 is a flowchart showing a normal shooting operation of the single-lens reflex digital camera in the preferred embodiment of the present invention.
Figure 14:
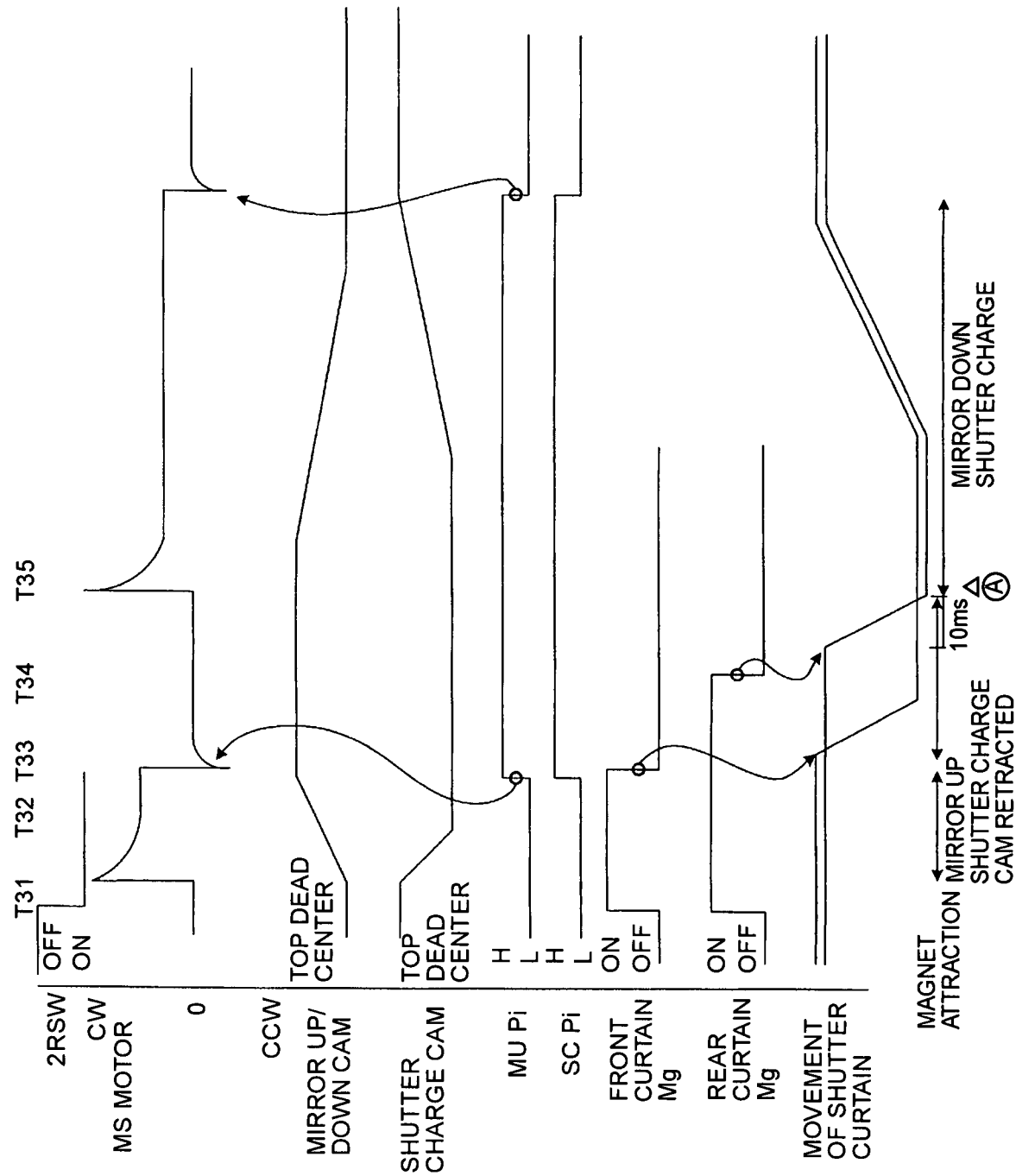
FIG. 14 is a timing chart for the normal shooting operation of the single-lens reflex digital camera in the preferred embodiment of the present invention.

Next, the normal shooting operation M121 will be described with reference to a flowchart of FIG. 10 and a timing chart of FIG. 14. In the information display M100 state, no live view display is provided on the LCD monitor 26. Under this condition, when the release button 21 is fully pressed to turn 2R on, the normal shooting operation M121 is started. In the normal shooting operation M121, power supply to the CCD 221 is first started (S361) to energize the magnets Mg for holding the shutter front curtain and the rear curtain, respectively, in order to suck in and hold the shutter curtains (T31 in FIG. 14). Then, the MS motor 301 is driven clockwise (CW) to drive the mirror charge cam 353, the mirror charge lever 351, and shutter charge cam 355, respectively (T32). As a result, the movable reflecting mirror 201 shifts from the down state to the up state. Further, the shutter charge cam 355 is engaged with the shutter charge lever 361 in the retracted state (P1 in FIG. 5B). Then, the energization of the front curtain magnet Mg holding the shutter front curtain is stopped to start the traveling of the shutter front curtain (S365; T33).

Counting of the exposure time is started at the start of the traveling of the front curtain (S367), and after the lapse of a pre-calculated exposure time, power supply to the rear curtain magnet Mg holding the shutter rear curtain is stopped to start the traveling of the shutter rear curtain (S369; T34). Then, the procedure waits until the traveling of the shutter rear curtain is completed (for example, for about 10 ms) (S371). After the lapse of this time, the MS motor 301 is driven clockwise (CW) (S373; T35) to drive the mirror charge lever 351 and the shutter set lever 213b, respectively. As a result, the movable reflecting mirror 201 shifts from the up state to the down state. Further, the shutter charge cam 355 performs the shutter charge operation through the shutter charge lever 361. Then, subject image data captured by the CCD 221 based on the photoelectrically converted signal is transferred (S375). In the embodiment, the captured image data is transferred after completion of the shutter charge operation in step S373, but both steps can be executed concurrently like in the live-view shooting operation. After that, power supply to the CCD 221 is stopped (S377), and based on the captured image data transferred in step S375, the shot subject image is playback-displayed on the LCD monitor 26 for a predetermined period of time (S379). After completion of playback display, the display screen returns to the information display M100.

Thus, in the normal shooting operation according to the embodiment, when the release button 21 is operated to turn 2R on during the information display M100 in order to perform a shooting operation, the MS motor 301 is driven clockwise (CW) to perform the mirror-up operation and shutter charge. Unlike the live-view shooting operation M320, the mirror-up operation is performed. In the information display M100 mode, since the live view display is not provided, the movable reflecting mirror 201 is in the mirror-down state to allow viewing of the subject image through the optical finder. Therefore, the movable reflecting mirror 201 needs to be changed to the mirror-up state in order to perform shooting.

Figure 11:
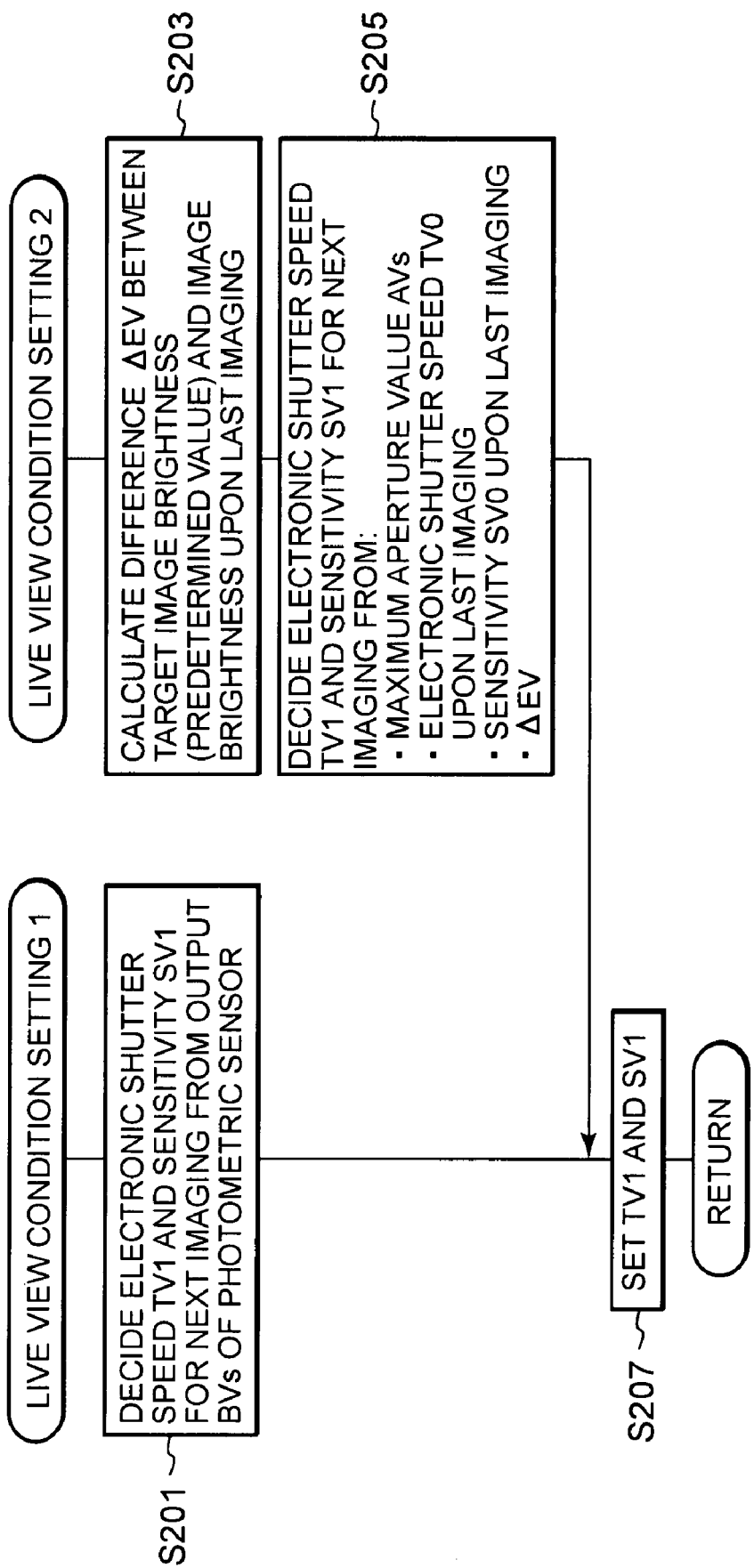
FIG. 11 is a flowchart showing live view condition setting 1 and live view condition setting 2 in the preferred embodiment of the present invention.

Referring next to FIG. 11, "Live View Display Condition Setting 1" and "Live View Display Condition Setting 2" will be described. As mentioned above, these subroutines are to adjust image brightness upon displaying the subject image on the LCD monitor 26.

First, when entering the subroutine "Live View Display Condition Setting 1," the electronic shutter speed TV1 and the sensitivity SV1 for next imaging are decided in step S201 based on the output BVs of the photometric sensor 281. The aperture value upon live view display is the maximum aperture value. If this aperture value is AVs, the following relation is given:

$$AVs + TV1 = BVs + SV1,$$

and then, the following is obtained:

$$BVs - AVs = TV1 - SV1.$$

The values on the left-hand side of this equation are known, so that TV1 and SV1 can be determined properly from the values on the left-hand side according to a program line or table. After that, the determined electronic shutter speed TV1 and sensitivity SV1 are stored and set in a register (S207). The CCD drive circuit 223 controls the driving of the CCD 221 based on the set and stored TV1 and SV1 to read the photo-electrically converted signal from the CCD 221. After completion of setting TV1 and SV1 in step S207, the procedure returns to the main flow.

Next, "Live View Display Condition Setting 2" will be described. When entering the "Setting 2" subroutine, a difference $\Delta EV$ between a target image brightness (predetermined value) and the image brightness upon the previous imaging is first calculated (S203). Then, the electronic shutter speed TV1 and sensitivity SV1 for next imaging are decided to make the image brightness constant, (S205). The electronic shutter speed TV1 and sensitivity SV1 for next imaging are determined from the following factors:

maximum aperture value AVs
electronic shutter speed TV0 upon last imaging
sensitivity SV0 upon last imaging
difference $\Delta EV$ between target image brightness and image brightness upon last imaging The basic equation for exposure conditions is:

$$AVs + TV0 = BV0 + SV0$$

Here, BV0 is the last brightness, but the true value is unknown and BV0 is an assumed value in the basic equation. Since the true brightness value BV0 is deviated by the difference from the target, i.e., by $\Delta EV$, $$BV0 = AVs + TV0 - SV0 + \Delta EV$$
$$= AV1 + TV1 - SV1$$

From this relational expression, TV1 and SV1 are determined. Here, for example, the difference $\Delta EV$ can be determined from a difference between the weighted average of respective pixel outputs of the image pickup device and a target value. After completion of step S205, the procedure goes to the above-mentioned step S207 and returns to the main flow.

In the embodiment, a live view is displayed on the LCD monitor 26 based on the output of the CCD 221 used as the image pickup device for image recording, and this makes it easy to view the subject image. Further, while the live view is being displayed on this LCD monitor 26, if the release button 21 is fully pressed to shift to the shooting operation, only the shutter charge is done without up or down movement of the movable reflecting mirror 201. Therefore, mechanically generated sound can be minimized upon shooting.

Further, in the embodiment, upon returning to the live view display after completion of shooting, the shutter 213 is opened after only the shutter charge is done without up or down movement of the movable reflecting mirror 201. Thus, unnecessary driving of the movable reflecting mirror 201 is excluded, thereby making it possible to minimize mechanically generated sound.

Further, in the embodiment, the shutter 213 is opened after it is closed once even upon live-view shooting, and this can prevent a smear phenomenon from occurring to the image pickup device.

In the embodiment, the rotation of the MS motor 301 in one direction (clockwise) triggers both the up/down movement of the movable reflecting mirror 201 and the shutter charge, while the rotation of the MS motor 301 in the other direction (counterclockwise) triggers only the shutter charge. Thus, the two operations (movements) can be performed using only the single motor as a drive source, and this can reduce the costs.

Further, in the embodiment, the planetary gear mechanism is used to switch the transmission of the driving force. Thus, the switching operation can be performed with such a simple structure, and this can reduce the costs.

Further, in the embodiment, the cam mechanism is divided into two cams, namely the shutter charge cam 355 and the mirror charge cam 353, and this can increase the freedom of movement of the cams, respectively.

In the embodiment, the movable reflecting mirror 201 switches the optical path between the finder optical system and the image pickup device, but the present invention is not limited to this structure. For example, the present invention can, of course, be applied to such a structure to switch the optical path between the image pickup device for image recording and an image pickup device for subject image viewing.

Further, in the embodiment, the transmission direction of the driving force of the MS motor 301 as the drive source is switched using the main gear 313, the carrier 315, and the planetary gears 317, 323, but the present invention is not limited to this structure. For example, the gears themselves can be moved directly to release meshing therebetween.

Further, in the embodiment, the cam mechanism is divided into two cams, namely the shutter charge cam 355 and the mirror charge cam 353, but the present invention is not limited to this cam structure. A single cam can also be used for shutter charge and mirror charge. Further, in the embodiment, the single CCD 221 is used as the image pickup device, but the present invention can, of course, be applied to a camera for switching over between outputs of a plurality of image pickup devices to display a live view.

As described above, in the embodiment, the single-lens reflex camera includes: the MS motor 301; the image pickup device (CCD 221); the movable reflecting mirror 201 movable between the first position (down position) for reflecting subject light from the photographing lenses 101, 102 arranged in front of the image pickup device, and the second position (up position) retracted from the optical path of the photographing lenses 101, 102 to guide the subject light to the image pickup device; the shutter 213 arranged between the image pickup device (CCD 221) and the movable reflecting mirror 201; a first drive mechanism (e.g., the gears 325 to 333, the shutter charge cam 355, the cam gear 359, the shutter charge lever 361, and the shutter set lever 213b) for charging the shutter; a second drive mechanism (e.g., the gears 319 and 321, the cam gear 357, the mirror charge cam 353, the mirror charge lever 351, and the mirror drive lever 341) for driving the movable reflecting mirror 201; and a third drive mechanism (e.g., the main gear 313, the carrier 315, and the planetary gears 317, 323) for driving the first drive mechanism and the second drive mechanism by using the rotation of the MS motor 301 in one direction (CW direction), or for driving only the first drive mechanism by using the rotation of the MS motor 301 in the other direction (CCW direction) Therefore, when entering a shooting operation while a live view is being displayed, only the shutter charge is done, so that unnecessary driving of the movable reflecting mirror can be excluded, thereby making it possible to reduce sound offensive to the ear.

Further, in the embodiment, the single-lens reflex camera includes: the movable reflecting mirror 201 movable between the first position (down position) on the shooting optical path of the photographing lenses 101, 102, and the second position (up position) retracted from the shooting optical path; the image pickup device (CCD 221) arranged on the shooting optical path of the photographing lens to receive light of a subject image formed through the photographing lens and output a photoelectrically converted signal; the shutter 213 arranged between this image pickup device and the movable reflecting mirror 201 to control the exposure time for the subject image on the image pickup device; the display device (LCD monitor 26) for providing a live view display of the subject image based on the photoelectrically converted signal; and the driving control mechanism (body CPU 22) which, upon providing the live view display, drives the movable reflecting mirror 201 to the second position (up position) (S67; T00) and the shutter 213 to the open state (S69; T01), while upon receipt of a shooting operation instruction during the live view display (S81; T1), which controls the exposure time (S333 to S337; T5, T6) after performing the shutter charge operation of the shutter 213 (S87; T2) while keeping the movable reflecting mirror 201 at the second position (up position). Therefore, upon displaying a live view, both the driving of the movable reflecting mirror and the shutter charge are performed, while when entering the shooting operation in the live-view display state, only the shutter charge is done. This can reduce the sound offensive to the ear.

While there has been shown and described what is considered to be a preferred embodiment of the invention, it will, of course, be understood that various modifications and changes in form or detail could readily be made without departing from the spirit of the invention. It is therefore intended that the invention not be limited to the exact form described and illustrated, but constructed to cover all modifications that may fall within the scope of the appended claims.

What is claimed is:

1. A single-lens reflex camera capable of displaying a live view, the camera comprising:
   a motor;
   an image pickup device;
   a movable reflecting mirror movable between a first position for reflecting subject light from a photographing lens arranged in front of the image pickup device, and a second position retracted from the optical path of the photographing lens to guide the subject light from the photographing lens to the image pickup device;
   a shutter arranged between the image pickup device and the movable reflecting mirror;
   a first drive mechanism for charging the shutter;
   a second drive mechanism for driving the movable reflecting mirror between the first position and the second position; and
   a third drive mechanism for driving the first drive mechanism and the second drive mechanism by using the rotation of the motor in a first direction, or for driving only the first drive mechanism by using the rotation of the motor in a second direction.

2. The single-lens reflex camera according to claim 1, wherein the third drive mechanism includes a planetary clutch mechanism to transmit a driving force to both the first drive mechanism and the second drive mechanism by using the rotation of the motor in the first direction, or to transmit the driving force to only the first drive mechanism by using the rotation of the motor in the second direction.

3. The single-lens reflex camera according to claim 1, wherein the first drive mechanism has a cam mechanism for charging the shutter, and the second drive mechanism has a cam mechanism for driving the movable reflecting mirror.

4. The single-lens reflex camera according to 1, wherein the third drive mechanism includes a planetary gear clutch, the first drive mechanism and the second drive mechanism each include a gear train detachably coupled to the planetary gear clutch, the gear train included in the first drive mechanism has a first gear train for charging the shutter in response to the rotation of the motor in the first direction, and a second gear train for charging the shutter in response to the rotation of the motor in the second direction, the planetary gear clutch comprises a sun gear and two planetary gears, both the planetary gears are forced by the rotation of the motor in the first direction to move around the sun gear in one direction within a limited range so that one planetary gear is coupled to the first gear train connected with the first drive mechanism and the other planetary gear is coupled to a gear train connected with the second drive mechanism, and both the planetary gears are forced by the rotation of the motor in the second direction to move around the sun gear in the other direction so that coupling of one planetary gear to the first gear train is changed to the second gear train and coupling of the other planetary gear to the gear train connected with the second drive mechanism is released.

5. A single-lens reflex camera capable of displaying a live view, the camera comprising:

a motor;

an image pickup device;

a finder optical system for viewing an image formed through a photographing lens;

a movable reflecting mirror movable between a first position for reflecting subject light from the photographing lens arranged in front of the image pickup device to guide the subject light to the finder optical system, and a second position retracted from a space between the image pickup device and the photographing lens to guide the subject light from the photographing lens to the image pickup device;

an image display screen for displaying an image captured by the image pickup device;

a shutter arranged between the image pickup device and the movable reflecting mirror;

a first drive mechanism for charging the shutter;

a second drive mechanism for driving the movable reflecting mirror;

a third drive mechanism for driving the first drive mechanism and the second drive mechanism by using the rotation of the motor in a first direction, and for driving only the first drive mechanism by using the rotation of the motor in a second direction;

a release part for acquiring the image from the image pickup device as a still image; and a control part for controlling the motor to rotate in the second direction when the image captured by the image pickup device is being displayed on the image display screen in response to the release part so that the third drive mechanism drives only the first drive mechanism.

6. The single-lens reflex camera according to claim 5, wherein the third drive mechanism includes a planetary clutch mechanism.

7. The single-lens reflex camera according to claim 5, wherein the first drive mechanism has a cam mechanism for charging the shutter, and the second drive mechanism has a cam mechanism for driving the movable reflecting mirror.

8. A single-lens reflex camera capable of displaying a live view, the camera comprising:

a movable reflecting mirror movable between a first position on a shooting optical path of a photographing lens and a second position retracted from the shooting optical path;

an image pickup device arranged on the shooting optical path of the photographing lens to receive light of a subject image formed through the photographing lens and output a photoelectrically converted signal;

a shutter arranged between the image pickup device and the movable reflecting mirror to control an exposure time for the subject image on the image pickup device;

a display device for providing a live view display of the subject image based on the photoelectrically converted signal; and a control part which, upon providing the live view display, drives the movable reflecting mirror to the second position and the shutter to an open state, while upon receipt of a shooting operation instruction during the live view display, which controls the exposure time after performing the shutter charge operation while keeping the movable reflecting mirror at the second position.

9. The single-lens reflex camera according to claim 8 further comprising:

a reflecting mirror drive mechanism for driving the movable reflecting mirror between the first position and the second position; and a shutter charge mechanism for performing shutter charge of the shutter, wherein when the shooting operation is instructed, the control part drives only the shutter charge mechanism before performing control of the exposure time.

10. The single-lens reflex camera according to claim 8, wherein after completion of the shooting operation, the control part drives only the shutter charge mechanism, instructs to open the shutter, and resumes the live view display.

11. The single-lens reflex camera according to claim 8, wherein the shutter charge mechanism has a cam mechanism for charging the shutter, and the reflecting mirror drive mechanism has a cam mechanism for driving the movable reflecting mirror.

12. The single-lens reflex camera according to claim 8 further comprising:

a single motor; and a switching mechanism for transmitting the rotation of the motor in a first direction to the shutter charge mechanism and the reflecting mirror drive mechanism and the rotation of the motor in a second direction to only the shutter charge mechanism, wherein the control part controls the switching mechanism.

13. The single-lens reflex camera according to claim 12, wherein the switching mechanism comprises a planetary gear clutch and a gear train detachably coupled to the planetary gear clutch, the gear train in the shutter charge mechanism has a first gear train for charging the shutter in response to the rotation of the motor in a first direction, and a second gear train for charging the shutter in response to the rotation of the motor in a second direction, the planetary gear clutch comprises a sun gear and two planetary gears, both the planetary gears are forced by the rotation of the motor in the first direction to move around the sun gear in the first direction within a limited range so that one planetary gear is coupled to the first gear train connected with the shutter charge mechanism and the other planetary gear is coupled to a gear train connected with the reflecting mirror drive mechanism, and both the planetary gears are forced by the rotation of the motor in the second direction to move around the sun gear in the other direction so that coupling of one planetary gear to the first gear train is changed to the second gear train and coupling of the other planetary gear to the gear train connected with the reflecting mirror drive mechanism is released.

14. A single-lens reflex camera capable of providing a live view display to display images repeatedly acquired by an image pickup device on a display device as a real-time moving picture, the camera comprising:

a reflecting mirror drive mechanism for driving a movable reflecting mirror arranged on a shooting optical path;

a shutter charge mechanism for charging a shutter for controlling an exposure time to the image pickup device;

a single drive source;

a driving-force transmission switching mechanism for changing the destination of transmitting the driving force between both of the reflecting mirror drive mechanism and the shutter charge mechanism, and only the shutter charge mechanism; and a drive control part which, upon normal shooting, transmits the driving force to both the movable reflecting mirror drive mechanism and the shutter charge mechanism through the driving-force transmission switching mechanism, and upon shooting in the live-view display state, which transmits the driving force to only the shutter charge mechanism through the driving-force transmission switching mechanism.

15. The single-lens reflex camera according to claim 14, wherein the driving-force transmission switching mechanism includes a planetary clutch mechanism to transmit the driving force to both the movable reflecting mirror drive mechanism and the shutter charge mechanism vy using the rotation of the single drive source in a first direction, and to transmit the driving force to only the shutter charge mechanism by using the rotation of the single drive source in a second direction.

16. The single-lens reflex camera according to claim 15, wherein the driving-force transmission switching mechanism includes a planetary gear clutch meshable with gear trains respectively included in the shutter charge mechanism and the reflecting mirror drive mechanism, the gear trains being detachably coupled to the planetary gear clutch, the gear train of the shutter charge mechanism has a first gear train for charging the shutter in response to the rotation of the single drive source in the first direction and a second gear train for charging the shutter in response to the rotation of the single drive source in the second direction, the planetary gear clutch comprises a sun gear and two planetary gears, both the planetary gears are forced by the rotation of the single drive source in the first direction to move around the sun gear in one direction within a limited range so that one planetary gear is coupled to the first gear train connected with the shutter charge mechanism and the other planetary gear is coupled to a gear train connected with the reflecting mirror drive mechanism, and both the planetary gears are forced by the rotation of the single drive source in the second direction to move around the sun gear in the other direction so that coupling of one planetary gear to the first gear train is changed to the second gear train and coupling of the other planetary gear to the gear train connected with the reflecting mirror drive mechanism is released.

17. The single-lens reflex camera according to claim 16, wherein the movable reflecting mirror drive mechanism has a cam mechanism for driving the movable reflecting mirror and the shutter charge mechanism has a cam mechanism for charging the shutter.

18. The single-lens reflex camera according to claim 14, wherein the movable reflecting mirror drive mechanism has a cam mechanism for driving the movable reflecting mirror, and the shutter charge mechanism has a cam mechanism for charging the shutter.

19. A driving method for a single-lens reflex camera capable of displaying a live view, the method comprising:

rotating a motor in response to an imaging instruction, the motor rotating in a first direction in a live view display state, and in a second direction in states other than the live view display state;

decoupling a gear train between the motor and a movable mirror by a driving force when the motor rotates in the first direction, and not decoupling when the motor rotates in the second direction;

driving the movable mirror by the driving force of the motor, when the gear train between the motor and the movable mirror is not decoupled, to move the, movable mirror to a position retracted from an imaging optical path; and opening a shutter to allow light passing through a photographing lens to enter an image pickup device in order to perform imaging.

* * * * *